United States Patent
Snell

(10) Patent No.: US 12,427,806 B2
(45) Date of Patent: Sep. 30, 2025

(54) AXLE FOR AN OFF-HIGHWAY VEHICLE ("OHV")

(71) Applicant: Goat'ish LLC, Plain City, UT (US)

(72) Inventor: Eric Snell, Plain City, UT (US)

(73) Assignee: Goat'ish LLC, Plain City, UT (US)

( * ) Notice: Subject to any disclaimer, the term of this patent is extended or adjusted under 35 U.S.C. 154(b) by 415 days.

(21) Appl. No.: 18/112,068

(22) Filed: Feb. 21, 2023

(65) Prior Publication Data

US 2023/0264517 A1    Aug. 24, 2023

Related U.S. Application Data

(60) Provisional application No. 63/311,892, filed on Feb. 18, 2022.

(51) Int. Cl.
*B60B 35/14* (2006.01)
*B60B 35/04* (2006.01)
*B60B 35/12* (2006.01)

(52) U.S. Cl.
CPC .............. *B60B 35/14* (2013.01); *B60B 35/04* (2013.01); *B60B 35/122* (2013.01)

(58) Field of Classification Search
CPC ........ B60B 35/14; B60B 35/04; B60B 35/122
See application file for complete search history.

(56) References Cited

U.S. PATENT DOCUMENTS

| | | | |
|---|---|---|---|
| 4,806,042 A | 2/1989 | Swank et al. | |
| 8,186,698 B2 | 5/2012 | Gunderson | |
| 10,308,070 B1 * | 6/2019 | Carroll | B60B 27/06 |
| 12,066,072 B1 * | 8/2024 | Tatum | F16D 9/06 |
| 2009/0148230 A1 | 6/2009 | Laisement et al. | |
| 2020/0298621 A1 * | 9/2020 | Burchett | B60B 35/1027 |
| 2021/0148411 A1 | 5/2021 | Feichter et al. | |
| 2024/0066921 A1 * | 2/2024 | Balbach | B60B 35/18 |

FOREIGN PATENT DOCUMENTS

| | | |
|---|---|---|
| CN | 204533248 U | 8/2015 |
| CN | 205744980 U | 11/2016 |
| CN | 206694447 U | 12/2017 |
| CN | 208040978 U | 11/2018 |
| CN | 208734743 U | 4/2019 |
| DE | 102005026874 B4 | 5/2017 |

* cited by examiner

*Primary Examiner* — Faye M Fleming
(74) *Attorney, Agent, or Firm* — Kunzler Bean & Adamson; Bruce R. Needham

(57) ABSTRACT

An apparatus for a split axle includes a split axle of a vehicle with a first shaft and a second shaft. The first shaft includes a sleeve and the second shaft includes an inserted portion that is inserted into the sleeve of the first shaft. The inserted portion is rotatable within the sleeve. The apparatus includes a locking mechanism that includes a locked state and an unlocked state. The first shaft and the second shaft rotate together at a same speed when the locking mechanism is in the locked state and the first shaft and the second shaft rotate independently when the locking mechanism is in the unlocked state.

20 Claims, 17 Drawing Sheets

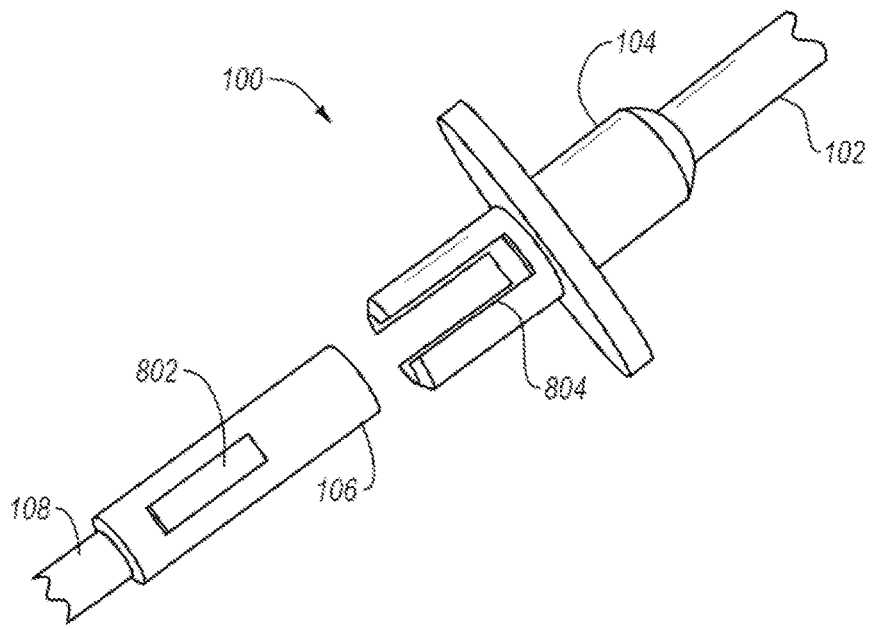
FIG. 8A
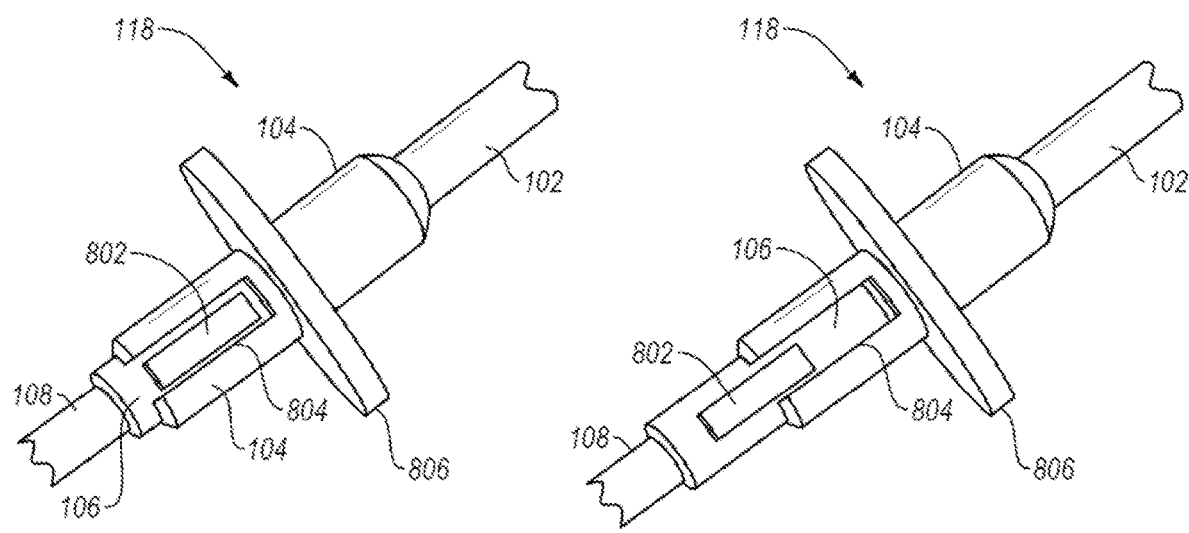
FIG. 8B
FIG. 8C

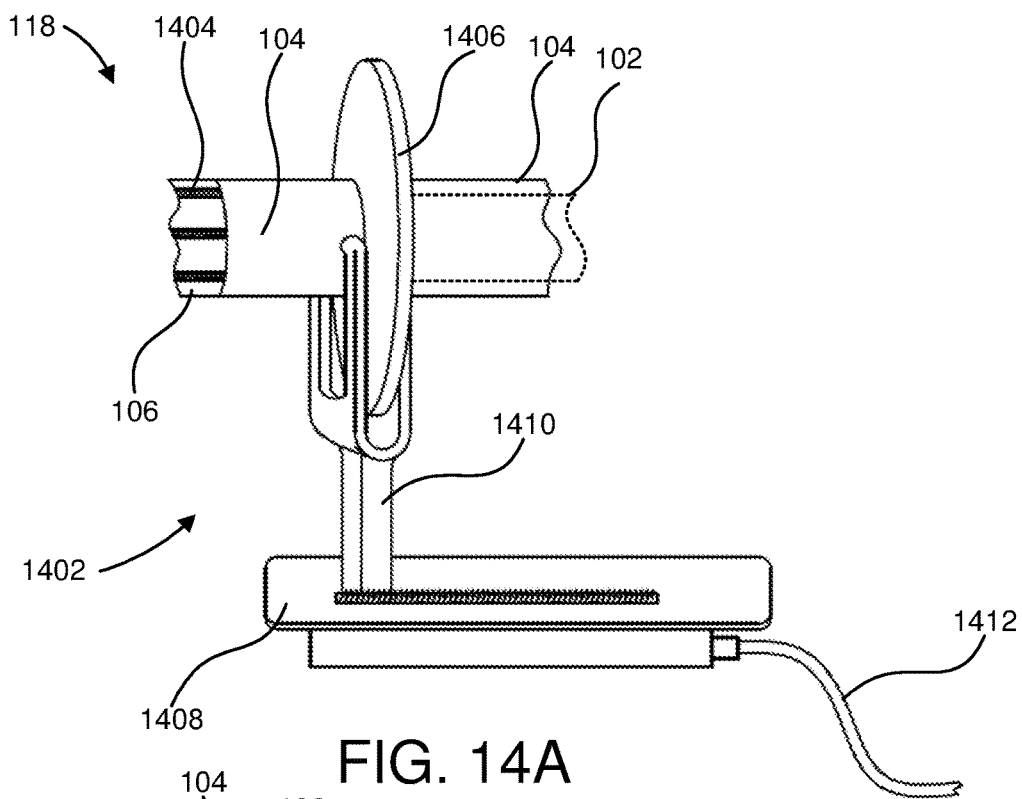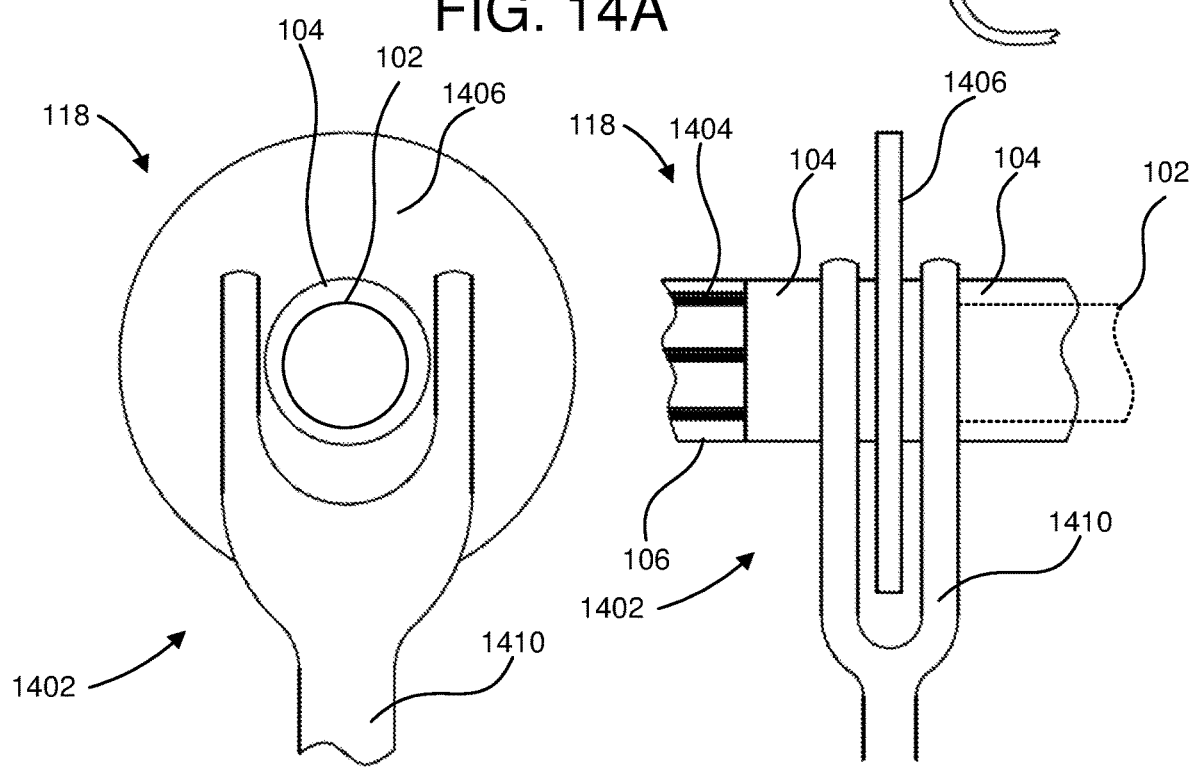
FIG. 14A
FIG. 14B FIG. 14C

AXLE FOR AN OFF-HIGHWAY VEHICLE ("OHV")

CROSS-REFERENCES TO RELATED APPLICATIONS

This application claims the benefit of U.S. Provisional Patent Application No. 63/311,892 entitled "IMPROVEMENT TO AN AXLE FOR AN OFF-HIGHWAY VEHICLE ("OHV")" and filed on Feb. 18, 2022 for Eric Snell, which is incorporated herein by reference.

FIELD

This invention relates to axles of off-highway vehicles and more particularly relates to a split axle for an off-highway vehicle.

BACKGROUND

Off-highway vehicles often include a rear axle that turns such that both wheels spin at a same rate, which is useful for off-road situations where one rear drive wheel may be on slippery ground and the other rear drive wheel is on ground with better traction. However, when turning the rear wheels ideally turn at different rates because the rear wheels track paths of different lengths. On pavement, turning of an off-highway vehicle often causes unwanted wear on the rear wheels because one or both of the rear wheels necessarily slide across the pavement due to the different length paths that the rear wheels track during a turn.

SUMMARY

An apparatus for a split axle includes a split axle of a vehicle with a first haft and a second shaft. The first shaft includes a sleeve and the second shaft includes an inserted portion that is inserted into the sleeve of the first shaft. The inserted portion is rotatable within the sleeve. The apparatus includes a locking mechanism that includes a locked state and an unlocked state. The first shaft and the second shaft rotate together at a same speed when the locking mechanism is in the locked state and the first shaft and the second shaft rotate independently when the locking mechanism is in the unlocked state.

Another apparatus for a split axle includes a first axle of a vehicle connected between a gear box and a rear wheel. The first axle includes a split axle and the split axle includes a first shaft and a second shaft. The first shaft includes a sleeve and the second shaft includes an inserted portion that is inserted into the sleeve of the first shaft where the inserted portion is rotatable within the sleeve, a second axle connected between the gear box and a second rear wheel of the vehicle, and a locking mechanism that includes a locked state and an unlocked state. The first shaft and the second shaft rotate together at a same speed when the locking mechanism is in the locked state and the first shaft and the second shaft rotate independently when the locking mechanism is in the unlocked state.

A vehicle with a split axle includes a drive mechanism connected to a gear box and a first axle of the vehicle connected between the gear box and a rear wheel. The first axle includes a split axle and the split axle includes a first shaft and a second shaft. The first shaft includes a sleeve and the second shaft includes an inserted portion that is inserted into the sleeve of the first shaft. The inserted portion is rotatable within the sleeve. The vehicle includes a second axle connected between the gear box and a second rear wheel of the vehicle and a locking mechanism that includes a locked state and an unlocked state. The first shaft and the second shaft rotate together at a same speed when the locking mechanism is in the locked state and the first shaft and the second shaft rotate independently when the locking mechanism is in the unlocked state.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 8A is a perspective view schematic block diagram of the portion of split axle in FIGS. 1 and 2 where a sleeve is slidable along the split axle and the sleeve has a portion with a slot and an inserted portion has a portion with a key, according to various embodiments;

FIG. 8B is a perspective view schematic block diagram of the portion of the split axle in FIG. 8A where the sleeve is in a locked position in a first slide position, according to various embodiments;

FIG. 8C is a perspective view schematic block diagram of the portion of the split axle in FIG. 8A where the sleeve is in an unlocked state in a second slide position, according to various embodiments;

FIG. 14A is a perspective view schematic block diagram of a portion of the split axle in FIGS. 1 and 2 where the sleeve is slidable along the inserted portion using a fork-shaped automatic locking mechanism, according to various embodiments;

FIG. 14B is an end section view of the split axle of FIG. 14A, according to various embodiments;

FIG. 14C is a side view of the split axle of FIG. 14A, according to various embodiments;

DETAILED DESCRIPTION

Figure 1:
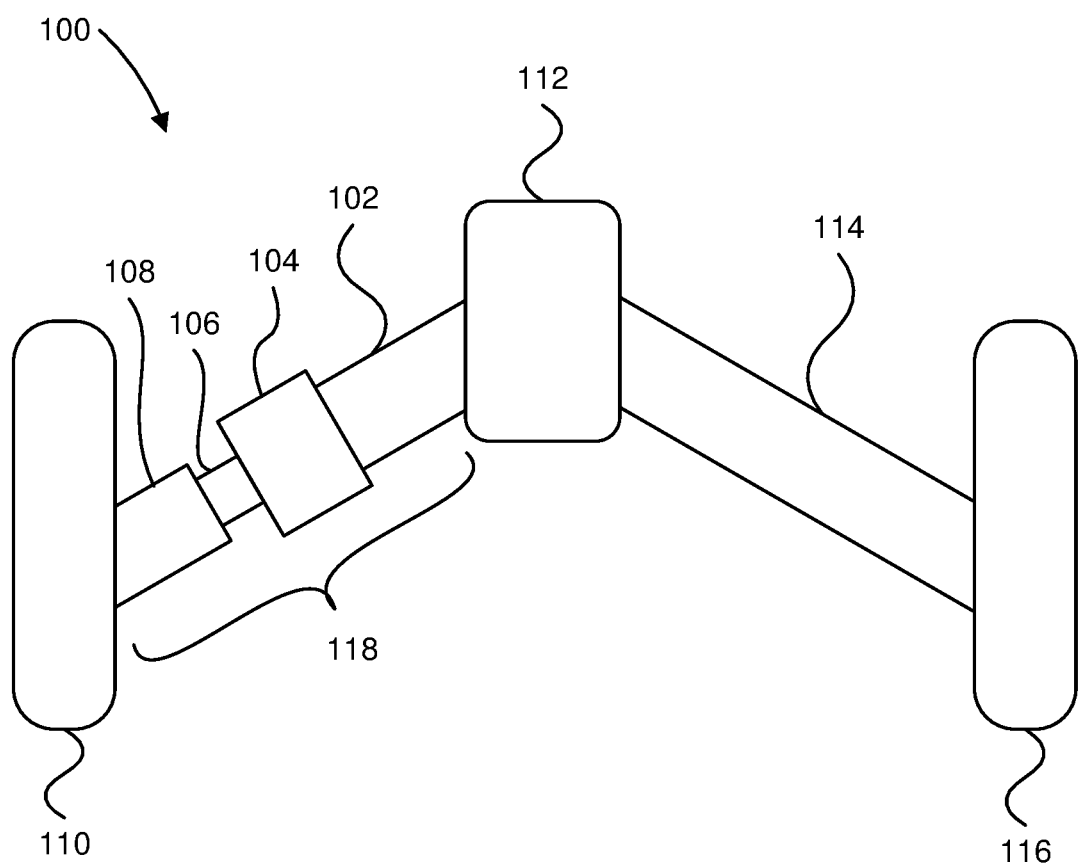
FIG. 1 is a rear view schematic block diagram illustrating axles of a vehicle, such as an off-highway vehicle ("OHV"), and a gear box with one axle being a split axle with a locking mechanism where the split axle includes a first shaft with a sleeve and a second shaft with an inserted portion that is inserted into the sleeve, according to various embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

An apparatus for a split axle includes a split axle of a vehicle with a first shaft and a second shaft. The first shaft includes a sleeve and the second shaft includes an inserted portion that is inserted into the sleeve of the first shaft. The inserted portion is rotatable within the sleeve. The apparatus includes a locking mechanism that includes a locked state and an unlocked state. The first shaft and the second shaft rotate together at a same speed when the locking mechanism is in the locked state and the first shaft and the second shaft rotate independently when the locking mechanism is in the unlocked state.

In some embodiments, the vehicle includes a first axle and a second axle that rotate front or rear wheels of the vehicle. The first axle and the second axle are each connected to a gear box and the split axle includes a portion of the first axle. The first shaft is connected to the gear box of the vehicle and the second shaft is connected to a front wheel or a rear wheel of the vehicle.

In other embodiments, the sleeve is slidable along the split axle, and a section of the sleeve includes a first coupling mechanism and a section of the inserted portion includes a second coupling mechanism. The locked state of the locking mechanism includes the sleeve positioned in a first slide position with the first coupling mechanism and the second coupling mechanism aligned and the unlocked state of the locking mechanism includes the sleeve positioned in a second slide position with the first coupling mechanism not aligned with and the second coupling mechanism. In other embodiments, the first coupling mechanism and the second coupling mechanism each include one or more teeth, one or more gears, one or more slots, and/or one or more keys. In other embodiments, the sleeve includes a moveable lever mounted remote from the sleeve where the lever in an engaged position places the sleeve in the first slide position such that the locking mechanism is in the locked state and the lever in a disengaged position places the sleeve in the second slide position such that the locking mechanism is in the unlocked state.

In some embodiments, the sleeve includes a first plate perpendicular to the first shaft and the inserted portion includes a second plate perpendicular to the second shaft, where the first plate includes one or more openings ("first openings") and the second plate includes one or more openings ("second openings"), and the first openings are alignable with the second openings. In the embodiments, the locked state of the locking mechanism includes at least one insert inserted through an opening of the first openings and an opening of the second openings and the unlocked state of the locking mechanism includes the first openings and the second openings without an insert. In other embodiments, the sleeve includes a first opening and the inserted portion includes a second opening, and the first opening of the sleeve is alignable with the second opening of the inserted portion. The locked state of the locking mechanism includes a pin inserted through the first opening and the second opening and the unlocked state of the locking mechanism includes the first opening and the second opening without a pin.

In some embodiments, the sleeve includes a first slot and the inserted portion includes a second slot, and the first slot and second slot are alignable. The locked state of the locking mechanism includes a key inserted through the first slot and the second slot and the unlocked state of the locking mechanism includes the first slot and second slot without a key. In other embodiments, the vehicle includes a single axle where the single axle includes a drive mechanism that rotates front wheels or rear wheels of the vehicle and a portion of the single axle includes the split axle where the first shaft is connected to the drive mechanism and the second shaft is connected to a front wheel or a rear wheel. In other embodiments, the drive mechanism includes a shaft-drive, a belt-drive, and/or a chain-drive.

In some embodiments, the locking mechanism is an automatic locking mechanism with an actuator where the actuator in a first state places the automatic locking mechanism in the locked state and the actuator in a second state places the automatic locking mechanism in the unlocked state. In other embodiments, the actuator is remote from the automatic locking mechanism and the actuator is connected a first end of a cable and the automatic locking mechanism is connected to a second end of the cable. In other embodiments, the sleeve includes a portion with a slot ("slot") and the inserted portion includes a portion with a key ("key"), and the sleeve is slidable along the split axle such that the key is insertable into the slot. The locked state of the locking mechanism includes the key inserted through the slot and the unlocked state of the locking mechanism includes the slot without the key.

In some embodiments, a portion of the first shaft, the sleeve, and at least a portion of the inserted portion of the second shaft include an oval shape, a rectangular shape, or a square shape, and the locked state of the locking mechanism includes the sleeve positioned in a first slide position with the inserted portion inside the sleeve and the unlocked state of the locking mechanism includes the sleeve positioned in a second slide position with the inserted portion outside the sleeve.

Another apparatus for a split axle includes a first axle of a vehicle connected between a gear box and a rear wheel. The first axle includes a split axle and the split axle includes a first shaft and a second shaft. The first shaft includes a sleeve and the second shaft includes an inserted portion that is inserted into the sleeve of the first shaft where the inserted portion is rotatable within the sleeve, a second axle connected between the gear box and a second rear wheel of the vehicle, and a locking mechanism that includes a locked state and an unlocked state. The first shaft and the second shaft rotate together at a same speed when the locking mechanism is in the locked state and the first shaft and the second shaft rotate independently when the locking mechanism is in the unlocked state.

In some embodiments, the first axle and the second axle form a solid rear axle and the gear box includes a shaft-drive, a belt-drive, or a chain-drive. In other embodiments, the sleeve is slidable along the split axle. A section of the sleeve includes a first coupling mechanism and a section of the inserted portion includes a second coupling mechanism. The locked state of the locking mechanism includes the sleeve positioned in a first slide position with the first coupling mechanism and the second coupling mechanism aligned and the unlocked state of the locking mechanism includes the sleeve positioned in a second slide position with the first coupling mechanism not aligned with and the second coupling mechanism. The first coupling mechanism and the second coupling mechanism each include one or more teeth, one or more gears, one or more slots, and/or one or more keys.

In some embodiments, the sleeve includes a first opening and the inserted portion includes a second opening, and the first opening of the sleeve is alignable with the second opening of the inserted portion. The locked state of the locking mechanism includes a pin inserted through the first opening and the second opening and the unlocked state of the locking mechanism includes the first opening and the second opening without a pin. In other embodiments, the locking mechanism is an automatic locking mechanism that includes an actuator. The actuator in a first state places the automatic locking mechanism in the locked state and the actuator in a second state places the automatic locking mechanism in the unlocked state.

A vehicle with a split axle includes a drive mechanism connected to a gear box and a first axle of the vehicle connected between the gear box and a rear wheel. The first axle includes a split axle and the split axle includes a first shaft and a second shaft. The first shaft includes a sleeve and the second shaft includes an inserted portion that is inserted into the sleeve of the first shaft. The inserted portion is rotatable within the sleeve. The vehicle includes a second axle connected between the gear box and a second rear wheel of the vehicle and a locking mechanism that includes a locked state and an unlocked state. The first shaft and the second shaft rotate together at a same speed when the locking mechanism is in the locked state and the first shaft and the second shaft rotate independently when the locking mechanism is in the unlocked state.

FIG. 1 is a rear view schematic block diagram 100 illustrating axles of a vehicle, such as an off-highway vehicle ("OHV"), and a gear box 112 with one axle being a split axle 118 with a locking mechanism where the split axle 118 includes a first shaft 102 with a sleeve 104 and a second shaft 108 with an inserted portion 106 that is inserted into the sleeve 104, according to various embodiments. An OHV is a motorized vehicle typically used for off-roading, such as an all-terrain vehicle ("ATV") or a utility task vehicle ("UTV"), however some OHVs are sometimes allowed to drive on paved roads. Some OHVs include a first axle connected to a first rear wheel and a second axle connected to a second rear wheel. The first axle and the second axle are also connected to a gear box that rotates the first axle and the second axle together at a same speed, which then rotate the first rear wheel and the second rear wheel at the same speed. While the descriptions included herein describe the vehicle as an OHV, the embodiments described herein are equally applicable to other vehicles where the wheels of an axle (e.g., rear wheels or front wheels) rotate at a same speed.

When driving an OHV off-road, for example on dirt, it is desirable to have both rear wheels rotate at the same speed to maintain better control of the OHV while moving in dirt, mud, snow, etc. However, driving an OHV on a paved road with both rear wheels rotating at the same speed can make it difficult and less safe to turn the OHV since each wheel travels a different distance around the turn. Where the OHV with wheels that rotate at the same speed is turning on pavement or other hard surface, turning causes unnecessary wear on the rear tires. In addition, turning is more difficult than off-road on dirt, sand, mud, etc. where the tires can slide a little during a turn. When turning on a paved road, it would be more desirable to allow the rear wheels to rotate independent of each other. In some embodiments, one rear wheel is controlled by the gear box or other drive mechanism and the other rear wheel rotates freely. The rear wheels then rotate at different speeds. In current OHVs where the rear wheels rotate together at the same speed, a driver is not able to reconfigure the OHV to allow the rear wheels to rotate independently when desired.

The split axle 118 in FIG. 1 allows for a driver to adjust an OHV to allow a first rear wheel 110 and a second rear wheel 116 to rotate at the same speed or independently from each other whenever desired. The OHV includes a first axle which is a split axle 118 and a second axle 114, both connected to a gear box 112. The split axle 118 is also connected to and rotates the first wheel 110, and the second axle 114 is also connected to and rotates the second rear wheel 116. The split axle 118 includes a first shaft 102 connected to the gear box 112 and a second shaft 108 connected to the first rear wheel 110. The first shaft 102 includes a sleeve 104, and the second shaft 108 includes an inserted portion 106 that is inserted into the sleeve 104. The inserted portion 106 is rotatable within the sleeve 104.

The split axle 118 includes a locking mechanism that can be placed in a locked state and in an unlocked state. The locking mechanism of the split axle 118 allows a user to choose when the split axle 118 is in a locked state and first and second rear wheels 110, 116 rotate at the same speed, and when the split axle 118 is in an unlocked state so first and second rear wheels 110, 116 are able to rotate at different speeds. In the locked state, the first shaft 102 and the second shaft 108 rotate together at the same speed as one axle, so both rear wheels of the OHV are rotated by the gear box at the same speed. In the unlocked state, the first shaft 102 and the second shaft 108 rotate independently, so the first rear wheel 110 rotates freely while the rotation speed of the second rear wheel 116 is controlled by the gear box 112. In some embodiments, the locking mechanism in the locked state includes the sleeve 104 and the inserted portion 106 locked together to rotate as one unit. The locking mechanism in the unlocked state allows the inserted portion 106 to rotate independently within the sleeve 104, which allows for the first rear wheel 110 to rotate freely.

In other embodiments, the first shaft 102 is connected to the first rear wheel 110 and the second shaft 108 is connected to the gear box 112. However, having the first shaft 102 connected to the gear box 112 and the second shaft 108 connected to the first rear wheel 110 allows water and other liquids to drain water from the split axle 118 in embodiments as depicted in FIG. 1.

Figure 2:
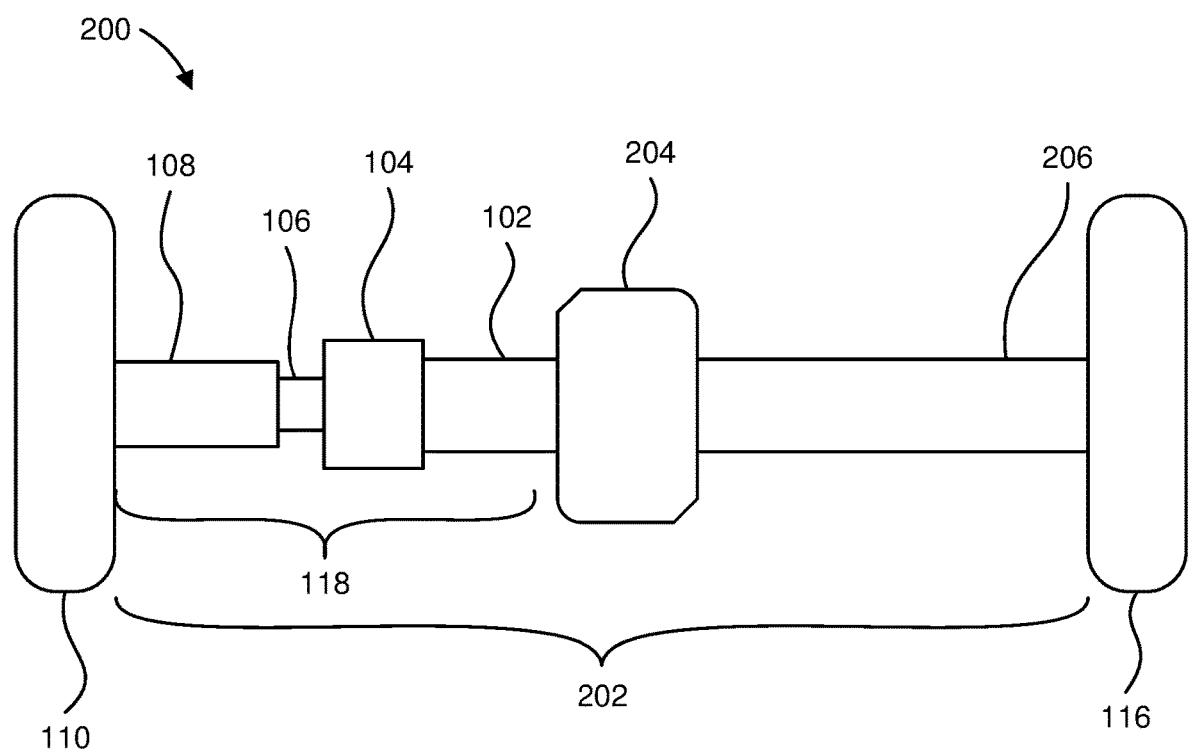
FIG. 2 is a rear view schematic block diagram illustrating a solid axle with a drive mechanism of a vehicle, such as an OHV, where a portion of the axle includes a split axle with a locking mechanism where the split axle includes a first shaft with a sleeve and a second shaft with an inserted portion that is inserted into the sleeve, according to various embodiments.

FIG. 2 is a rear view schematic block diagram 200 illustrating a solid axle 202 with a drive mechanism 204 of an OHV where a portion of the axle includes a split axle 118 with a locking mechanism and the split axle 118 includes a first shaft 102 with a sleeve 104 and a second shaft 108 including an inserted portion 106 that is inserted into the sleeve 104, according to various embodiments. Some OHVs include a single solid axle 202 connected to a first rear wheel 110 and a second rear wheel 116. The solid axle 202 includes a drive mechanism 204 to rotate the solid axle 202, which rotates the first rear wheel 110 and the second rear wheel 116 together at the same speed. In such OHVs, the drive mechanism 204 is a sprocket for a chain, a pully for a belt, a gear that meshes with another gear, or the like. The drive mechanism 204 typically is connected directly to the solid axle 202. In some embodiments, the solid axle 202 extends through the drive mechanism 204.

The solid axle 202 of FIG. 2 includes a portion 206 that is solid connected to the second rear wheel 116 and another portion connected to the first rear wheel 110 that includes the split axle 118. The split axle 118 includes a first shaft 102 connected to a drive mechanism 204, and a second shaft 108 connected to a first rear wheel 110, similar to those in FIG. 1. The first shaft 102 includes a sleeve 104, and the second shaft 108 includes an inserted portion 106 that is inserted into the sleeve 104. The inserted portion 106 is rotatable within the sleeve 104. The split axle 118 also includes a locking mechanism that can lock the sleeve 104 and the inserted portion 106 together in a locked state. The locking mechanism includes an unlocked state that allows for independent rotation of the inserted portion 106 within the sleeve 104. The first rear wheel 110 and a second rear wheel 116 rotate at the same speed when the locking mechanism is in the locked state, and the first rear wheel 110 and the second rear wheel 116 rotate independently when the locking mechanism is in the unlocked state. In other embodiments, the first shaft 102 could be connected to the first rear wheel 110, and the second shaft 108 could be connected to the drive mechanism 204. Embodiments of the split axle 118 and locking mechanism are described below.

Figure 3A:
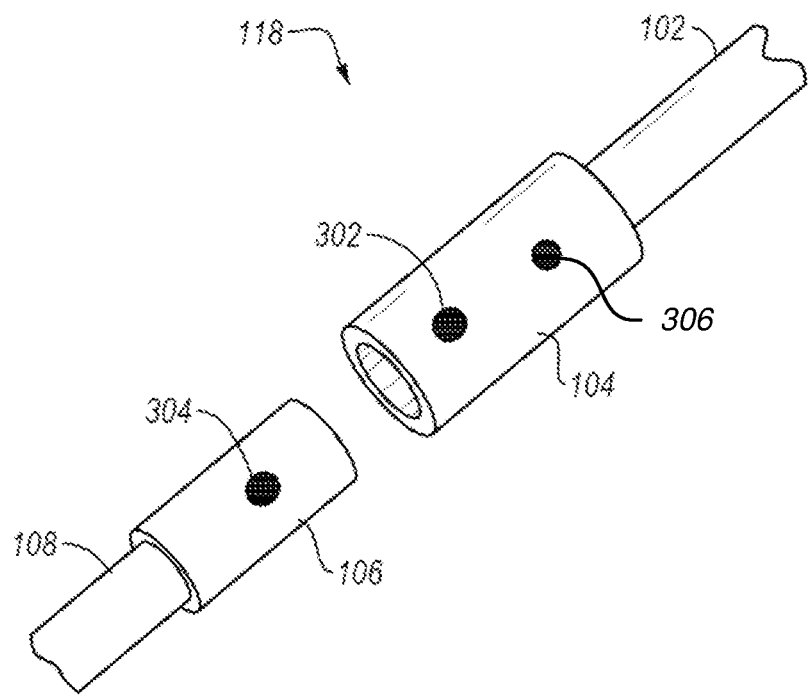
FIG. 3A is a perspective view schematic block diagram of a portion of the split axle of FIGS. 1 and 2 where the sleeve and the inserted portion each have an opening, according to various embodiments.

FIG. 3A is a perspective view schematic block diagram of a portion of the split axle 118 of FIGS. 1 and 2 where the sleeve 104 and the inserted portion each have an opening 302, 304, according to various embodiments. The first shaft 102 of the split axle 118 is shown separated from the second shaft 108 of the split axle 118 to show each component of the split axle 118. The first shaft 102 includes a sleeve 104 with a first opening 302, and the second shaft 108 includes an inserted portion 106 with a second opening 304 which function with a pin (not shown) as the locking mechanism. The inserted portion 106 is rotatable within the sleeve 104 without the pin installed in the unlocked state. The first opening 302 is alignable with the second opening 304 such that a pin is insertable through the first opening 302 and the second opening 304 in the locked state. In some embodiments, the first opening 302 and the second opening 304 are aligned by rotating the first shaft 102 and/or the second shaft 108. When the first opening 302 and the second opening 304 are aligned, the pin is insertable through the first and second openings 302, 304.

In some embodiments, the sleeve 104 includes first openings 302 on each side and the inserted portion 106 includes a second opening 304 that extends all the way through the inserted portion 106 and the pin extends all the way through the sleeve 104 and the inserted portion 106. In further embodiments, the pin is lockable in the openings 302, 304. For example, the pin may have a collar on one end and a hole on an opposite end where a spring clip, a cotter key, etc. is pushed through the hole in the pin. In other embodiments, the pin includes a hinged portion and when the pin extends through the hole, the hinged portion bends to a side to prevent the pin from coming out of the hole. In other embodiments, the pin includes a hinged spring clip that folds over the sleeve 104 and locks onto the pin to keep the pin in place.

In other embodiments, the pin is a bolt with threads that extend past the sleeve 104 and a nut is threaded onto the bolt. In the embodiments, a lock washer, a lock nut, multiple nuts, etc. are used to prevent the nut(s) from coming off the bolt. A lock nut may include a nylon bushing, a self-locking nut or other types of lock nuts known to those skilled in the art. In some embodiments, the mechanism to maintain the pin in the openings 302, 304 is easily removed, undone, etc. to allow a user to remove the pin and later to reinsert and to lock the pin. One of skill in the art will recognize other ways to hold the pin in the first and second openings 302, 304. While a single hole 302 in the sleeve 104 and a single hole 304 in the inserted portion 106 for a pin are depicted in FIG. 3A, other embodiments, include one or more additional holes 302, 304 for one or more additional pins. In some embodiments, the sleeve 104 includes a hole 306 for a grease zerk (not shown). A grease zerk allows grease to be pumped into the sleeve 104 to lubricate the interior portion of the sleeve 104 and the inserted portion 106.

Figure 3B:
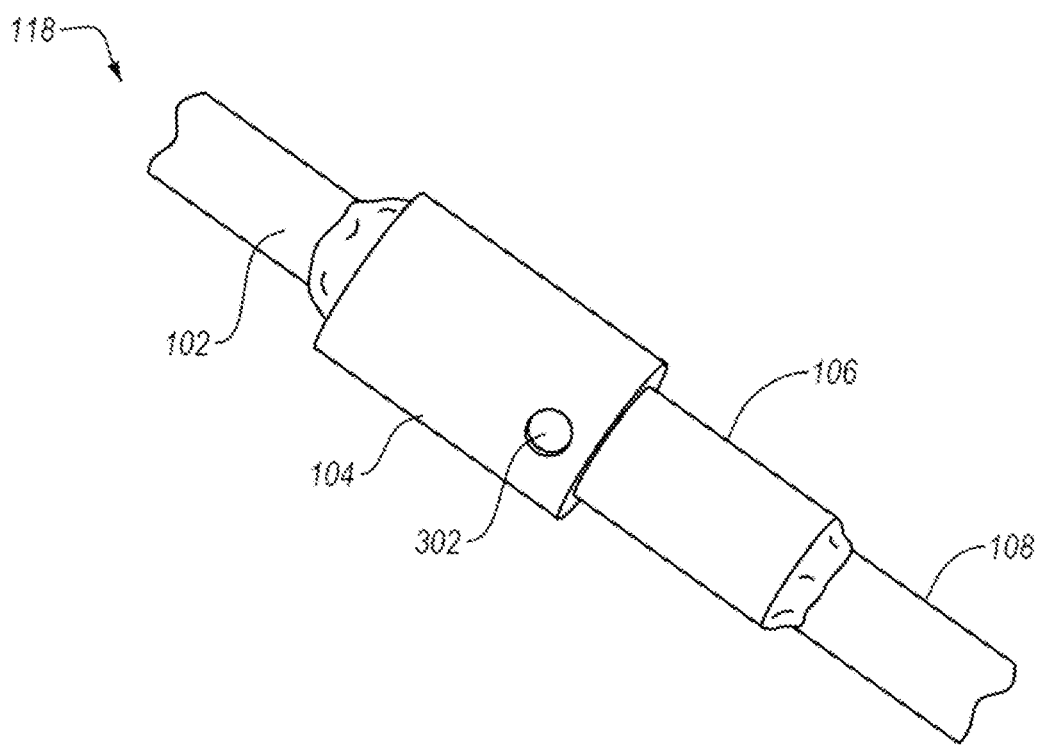
FIG. 3B is a picture of an embodiment of the portion of the split axle of FIG. 3A where the inserted portion is inserted into the sleeve, according to various embodiments.

FIG. 3B is a picture of an embodiment of the portion of the split axle of FIG. 3A where the inserted portion 106 is inserted into the sleeve 104, according to various embodiments. FIG. 3B is one embodiment of the split axle 118 of FIG. 3A mounted on an OHV. The inserted portion 106 is inserted into the sleeve 104, and is rotatable within the sleeve 104. The first opening 302 and the second opening of the inserted portion 106 are not aligned and are without a pin, so the locking mechanism is in the unlocked state. When driving the OHV, a gear box and/or a drive mechanism rotates the first shaft 102 and the inserted portion 106 rotates independently within the sleeve and the rear wheels rotate independently. The hole 306 for the grease zerk is not depicted but may be included.

In some embodiments, the sleeve 104 and inserted portion 106 have a length such that as the first rear wheel 110 and second rear wheel 116 moved up and down over various terrain that at least part of the inserted portion 106 remains in the sleeve 104. In some examples, travel of the wheels 110, 116 dictated by suspension components of the OHV are taken into account when sizing the sleeve 104 and inserted portion 106. In some embodiments, connection of the split axle 118 to the gear box 112 is flexible to allow movement of the split axle 118 with respect to the gear box 112 while remaining engaged with the gear box 112. Likewise, the second axle 114 has a flexible connection with the gearbox 112.

In some embodiments, the movement of the split axle 118 and/or second axle 114 with respect to the gear box 112 is by way of a joint, such as a U-joint or other flexible connection, that allows the split axle 118 and/or second axle 114 to rotate at the joint. In other embodiments, the joint allows a portion of the split axle 118 and/or second axle 114 to move in and out of the joint a certain distance. The OHV typically has suspension elements, such as shocks, springs, etc. that limit movement of the wheels 110, 116. In some embodiments, based on the suspension, joints at the gear box 112, etc., the lengths of the sleeve 104 and the inserted portion 106 are sized for maximum movement of the inserted portion 106 out of the sleeve 104 while an acceptable portion of the inserted portion 106 remains in the sleeve 104. The amount of the inserted portion 106 remaining in the sleeve 104 is enough to maintain mechanical strength of the split axle 118. Design of lengths of the sleeve 104 and inserted portion 106 are also applicable to all of the embodiments described below.

Figure 4A:
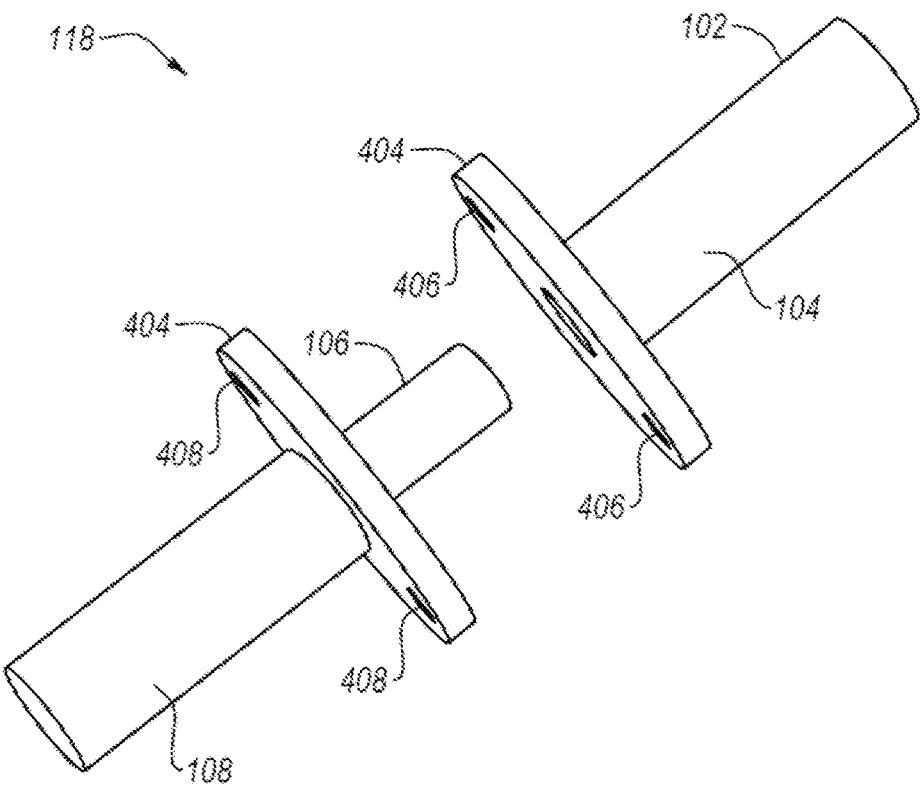
FIG. 4A is a perspective view schematic block diagram of a portion of the split axle of FIGS. 1 and 2 where the first shaft and the second shaft each have a plate with one or more openings, according to various embodiments.

FIG. 4A is a perspective view schematic block diagram of a portion of the split axle 118 of FIGS. 1 and 2 where the first shaft 102 and the second shaft 108 each have a plate 402, 404 with one or more openings 406, 408, according to various embodiments. The first shaft 102 includes a sleeve 104 and the second shaft 108 includes an inserted portion 106 that is rotatable within the sleeve 104. In some embodiments, the sleeve 104 includes a first plate 402 perpendicular to the first shaft 102, and the inserted portion 106 includes a second plate 404 perpendicular to the second shaft 108. The first plate 402 includes one or more openings 406 ("first openings 406"), and the second plate 404 includes one or more openings 408 ("second openings 408"). The first openings 406 are alignable with the second openings 408 such that an insert is insertable through the first openings 406 and the second openings 408.

Typically, in the unlocked state there is some rotational movement of the inserted portion 106 in the sleeve 104. Typically, the movement occurs when turning, when the second rear wheel 116 is spinning on ice, mud, etc. In some embodiments, a lubricant, such as grease, is inserted in the sleeve 104 between surfaces of the sleeve 104 and inserted portion 106 that are in contact with each other. In other embodiments, one or more bearings are included in the sleeve to facilitate the rotational movement. In other embodiments, surfaces of the sleeve 104 and/or inserted portion 106 include a low friction material. One of skill in the art will recognize other ways to reduce friction between the interior of the sleeve 104 and exterior of the inserted portion 106.

Figure 4B:
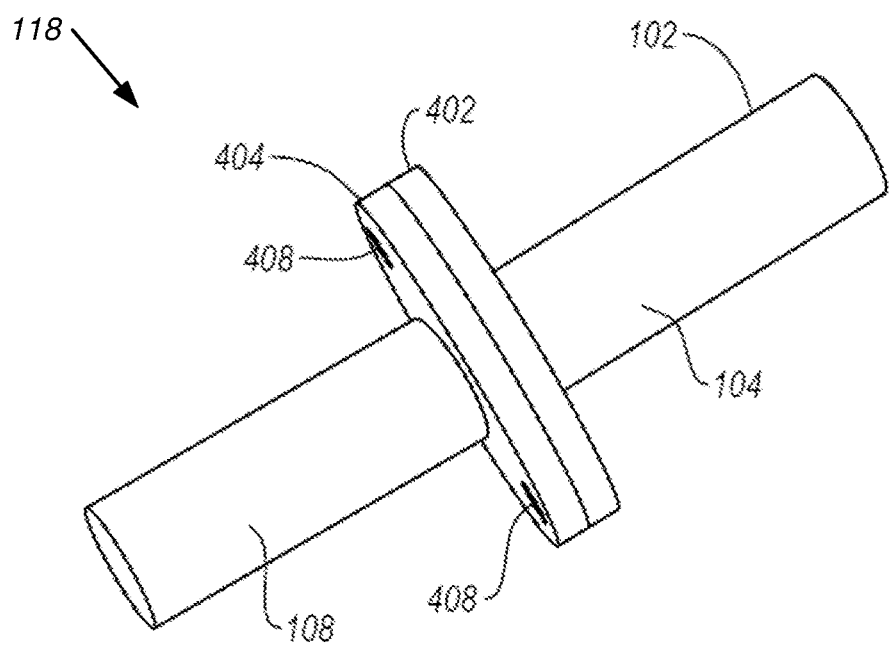
FIG. 4B is a perspective view schematic block diagram illustrating the portion of the split axle of FIG. 4A where the inserted portion is inserted into the sleeve and the plates are aligned, according to various embodiments.

FIG. 4B is a perspective view schematic block diagram illustrating the portion of the split axle 118 of FIG. 4A where the inserted portion 106 is inserted into the sleeve 104 and the plates 402, 404 are aligned, according to various embodiments. The inserted portion 106 is rotatable within the sleeve 104 when inserts are not in the first and second openings 406, 408. In the depicted embodiments of FIGS. 4A and 4B, the locking mechanism of the split axle 118 includes a locked state with insert(s) in the openings 406, 408, and an unlocked state without the insert(s). In the locked state, the first shaft 102 and the second shaft 108 are locked together and the split axle 118 rotates as one unit. The locking mechanism is in the locked state when the one or more openings ("first openings 406") of the first plate 402 are aligned with the one or more openings 408 ("second openings 408") of the second plate 404 ("second openings 408"), and one or more inserts are inserted through the first openings 406 of the first plate 402 and the second openings 408 of the second plate 404. In the unlocked state, the inserted portion rotates independently within the sleeve 104 without the one or more inserts in the first and second openings 406, 408.

In some embodiments, the first plate 402 includes a single first opening 406 and the second plate 404 includes a single second opening 408 alignable with the single first opening 406. In other embodiments, the first plate 402 includes two or more first openings 406 at various locations on the first plate 402 and the second plate 404 includes corresponding second openings 408 that are alignable with the first openings 406. In some embodiments, the inserts include a bolt that fits in the openings 406, 408 that is secured with a nut, a locknut, a lock washer, etc. In other embodiments, the insert is a pin with a collar on one end to prevent the insert from going past the collar and the insert is secured with a pin and spring clip, cotter key, rotatable spring clip, or other mechanism to hold the insert into the openings 406, 408. One of skill in the art will recognize other ways to secure an insert in the openings 406, 408 in a way that a user is able to insert and remove insert(s) in the openings 406, 408 at will. In various embodiments, the first and second plates 402, 404 are used with other embodiments, such as the embodiments of FIGS. 3A and 3B.

Figure 5:
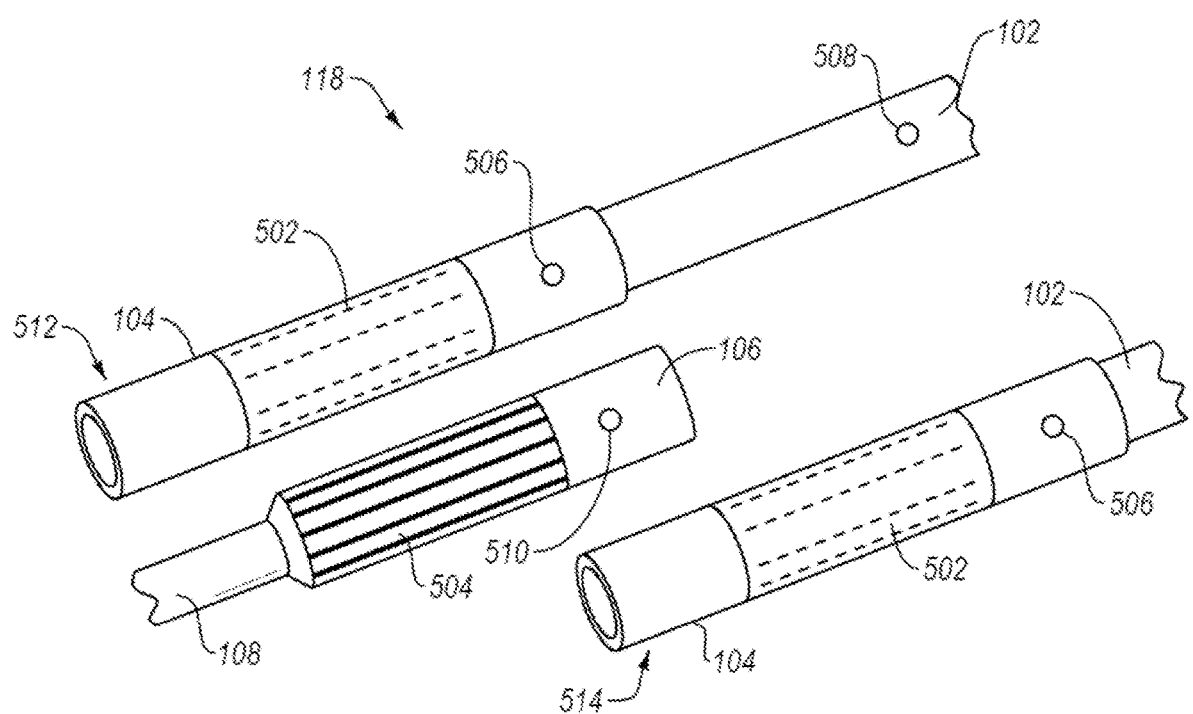
FIG. 5 is a perspective view schematic block diagram of a portion of the split axle of FIGS. 1 and 2 where the sleeve is slidable along the split axle, and the sleeve and the inserted portion each have a coupling mechanism, according to various embodiments.

FIG. 5 is a perspective view schematic block diagram of a portion of the split axle of FIGS. 1 and 2 where the sleeve 104 is slidable along the split axle 118, and the sleeve 104 and the inserted portion 106 each have a coupling mechanism, according to various embodiments. In the depicted embodiments, the first shaft 102 includes a sleeve 104 that is slidable along the split axle 118. The second shaft 108 includes an inserted portion 106 that is inserted into the sleeve 104 and is rotatable within the sleeve 104.

In some embodiments, a section of the sleeve 104 includes a first coupling mechanism 502 inside the sleeve 104, and a section of the inserted portion 106 includes a second coupling mechanism 504. In some embodiments, the first shaft 102 includes a third coupling mechanism in the sleeve 104 (not shown or is connected to the first coupling mechanism 502). In various embodiments, the first coupling mechanism 502, the second coupling mechanism 504, and the third coupling mechanism each include one or more teeth, gears, slots, keys, etc. The first coupling mechanism 502 is alignable with the second coupling mechanism 504 such that the first and second coupling mechanisms 502, 504 interlock mechanically so that the second shaft 108 rotates with the first shaft 102.

In some embodiments, the locking mechanism of the split axle 118 includes a locked state when the sleeve 104 is in a first slide position 512, and an unlocked state when the sleeve 104 is in a second slide position 514. In some examples, the first slide position 512 is when the sleeve 104 is extended in a direction away from the first shaft 102 such that at least a portion of the first coupling mechanism 502 is over the second coupling mechanism 504 so that the gears, grooves, teeth, etc. of the first and second coupling mechanisms 502, 504 mesh together and the first and second shafts 102, 108 rotate together. The second slide position 514 is when the sleeve 104 is retracted towards the first shaft 102 and the first and second coupling mechanisms 502, 504 are not aligned. A portion of the sleeve 104 without the first coupling mechanism 502 surrounds a portion of the inserted portion 106 without the second coupling mechanism 504. The portions of the sleeve 104 and inserted portion 106 without the first and second coupling mechanisms 502, 504 are smooth and/or do not mesh together so that the first shaft 102 rotates independently from the second shaft 108.

In some embodiments, the first shaft 102 does not have a third coupling mechanism and a pin is inserted through the hold in the sleeve 104 and either the hole 510 of the inserted portion 106 in the locked position or the hole 508 in the first shaft 102 in the unlocked position. In some embodiments, the first coupling mechanism 502 of the sleeve 104 is long enough so a portion of the first coupling mechanism 502 is over at least a portion of the third coupling mechanism of the first shaft 102 so the sleeve 104 rotates with the first shaft 102 when the sleeve is in the first slide position or the second slide position. In other embodiments, the sleeve 104 includes a fourth coupling mechanism (not shown) that couples with the third coupling mechanism of the first shaft 102 in the first or second slide position. In the embodiments, the first coupling mechanism 502 may be separated from the fourth coupling mechanism and the first coupling mechanisms 502 is positioned further away from the first shaft 102 than shown in FIG. 5 and the second coupling mechanism 504 is positioned further toward the first shaft 102 so the first and second coupling mechanisms 502, 504 align in a locked state when the sleeve 104 is retracted toward the first shaft 102 and the first and second coupling mechanisms 502, 504 are not aligned in an unlocked state when the sleeve 104 is extended away from the first shaft 102. One of skill in the art will recognize other coupling mechanisms and positions for the coupling mechanisms to achieve a locked state and an unlocked state by sliding the sleeve 104.

FIG. 5 depicts the second shaft 108 external to the first shaft 102. In operation, the inserted portion 106 of the second shaft 108 is inserted in the sleeve 104, for example, to a stop position at the first shaft 102. In the locked state, the sleeve 104 is slid so that the first coupling mechanism 502 is over the second coupling mechanism 504 so gears, teeth, protrusions, etc. mesh together and the second shaft 108 rotates with the first shaft 102.

In FIG. 5, holes 506, 508, 510 are depicted in the first shaft 102, sleeve 104 and inserted portion 106. The holes 506, 508, 510 enable fixing the sleeve 104 in a locked or unlocked position, for example, using a pin or insert as described above. The hole 510 in the inserted portion may be used in the locked state. In some examples, a pin, insert, or similar device may be inserted through a hole 506 in the sleeve 104, a hole 508 in a portion of the first shaft 102, and a hole 510 in the inserted portion 106. In the examples, the first shaft 106 may include a cavity to accommodate an end of the inserted portion 106 with a hole 510. In some embodiments, the first and second coupling mechanisms 502, 504 take the strain of rotation so that inserting and removing a pin or similar device through the holes 506, 508, 510 is easier than the embodiments of FIGS. 3A and 3B.

In other embodiments, the inserted portion 106 does not include a hole 510. In some embodiments, the sleeve 104 includes two holes 506 and the first shaft 102 includes a hole 508. In the embodiments, one hole 506 in the sleeve 104 is positioned to align with the hole 508 in the first shaft 102 when the sleeve 104 is in the first slide position and the other hole 506 in the sleeve 104 is positioned to align with the hole 508 in the first shaft 102 when the sleeve 104 is in the second slide position. In other embodiments, other mechanisms are used to secure the sleeve 104 in the first slide position and the second slide position. In some embodiments, the sleeve 104 includes a hole (not shown) for a grease zerk for lubrication.

Figure 6A:
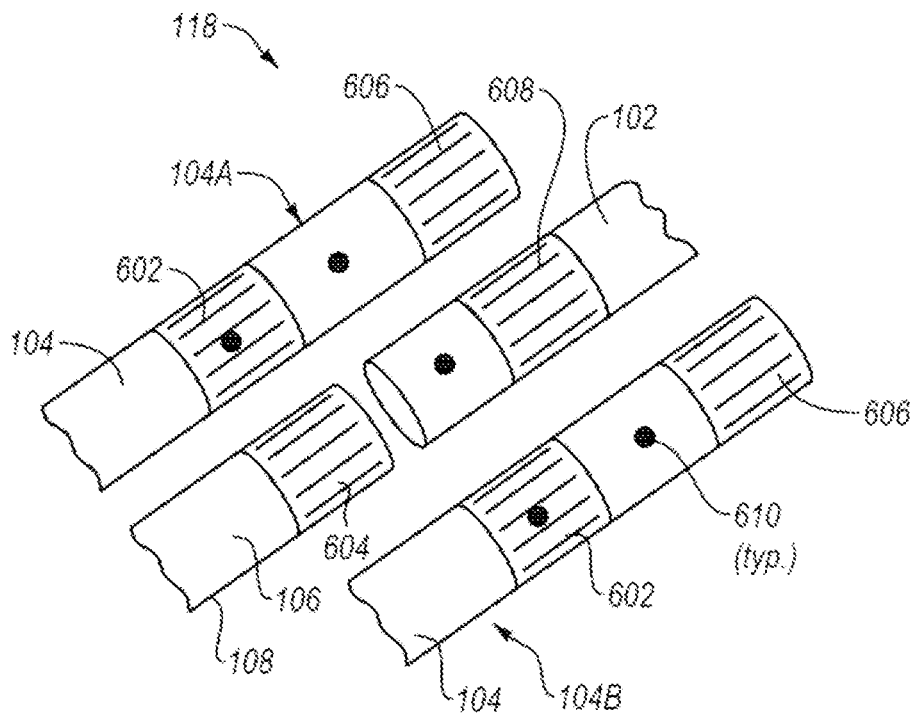
FIG. 6A is another perspective view schematic block diagram of a portion of the split axle of FIGS. 1 and 2 where the sleeve is slidable along the split axle and the sleeve, the first shaft, and the inserted portion each have a coupling mechanism, according to various embodiments.

FIG. 6A is another perspective view schematic block diagram of a portion of the split axle 118 of FIGS. 1 and 2 where the sleeve 104 is slidable along the split axle 118 and the sleeve 104, the first shaft 102, and the inserted portion 106 each have a coupling mechanism, according to various embodiments. FIG. 6A depicts a first position of the sleeve 104 ("first sleeve position 104A") and a second position of the sleeve 104 ("second sleeve position 104B"). The sleeve 104 has a first coupling mechanism 602 and the inserted portion 106 has a second coupling mechanism 604 where the inserted portion 106 and the second shaft 108 rotate with the sleeve 104 when the first and second coupling mechanisms 602, 604 are aligned. The sleeve 104 also includes a third coupling mechanism 606 and the first shaft 102 includes a fourth coupling mechanism 608. The first shaft 102, and sleeve 104 include holes 610 that maintain the sleeve 104 in a first slide position or a second slide position. Note that a part of the inserted portion 106 remain in the sleeve 104 for both the first and second slide positions.

When the sleeve 104 is in the first sleeve position 104A toward the second shaft 108, which corresponds to a locked state, the first and second coupling mechanisms 602, 604 align and the third and fourth coupling mechanisms 606, 608 align and the first and second shafts 102, 108 rotate together at a same speed. When the sleeve 104 is moved towards the first shaft 102 in the second sleeve position 104B, which corresponds to an unlocked state, the first and second coupling mechanisms 602, 604 do not align and the third and fourth coupling mechanisms 606, 608 do not align and the first and second shafts 102, 108 rotate independently.

Figure 6B:
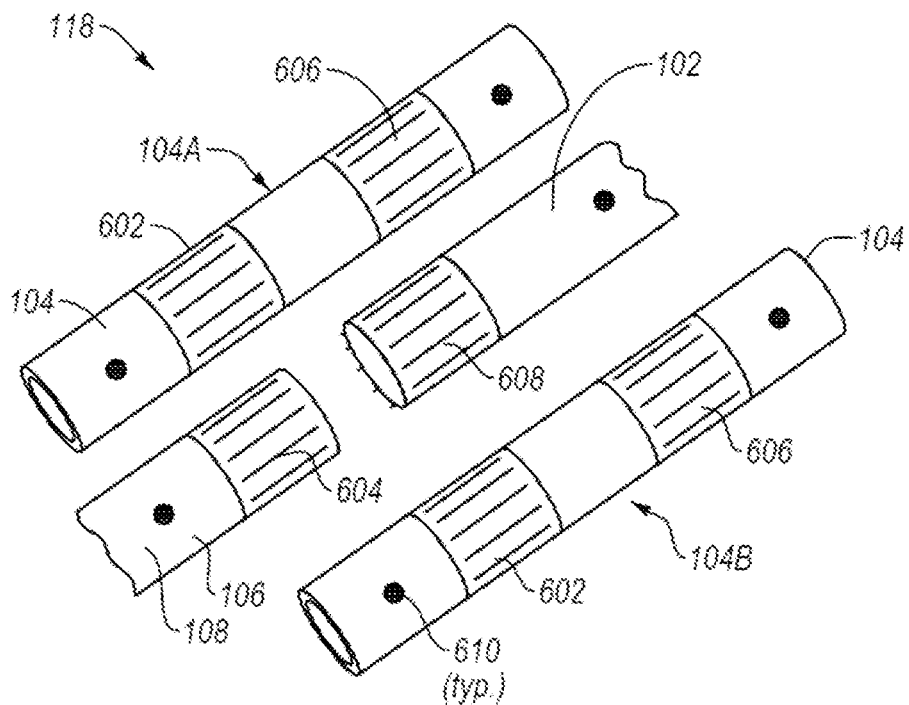
FIG. 6B is a different perspective view schematic block diagram of a portion of the split axle of FIGS. 1 and 2 where the sleeve is slidable along the split axle and the sleeve, the first shaft, and the inserted portion each have a coupling mechanism, according to various embodiments.

FIG. 6B is a different perspective view schematic block diagram of a portion of the split axle 118 of FIGS. 1 and 2 where the sleeve 104 is sliceable along the split axle 118 and the sleeve 104, the first shaft 102, and the inserted portion 106 each have a coupling mechanism, according to various embodiments. The embodiments depicted in FIG. 6B operate similarly to the embodiments in FIG. 6A except that the coupling mechanisms 602, 604, 606, 608 and holes 610 are positioned differently.

Figure 7A:
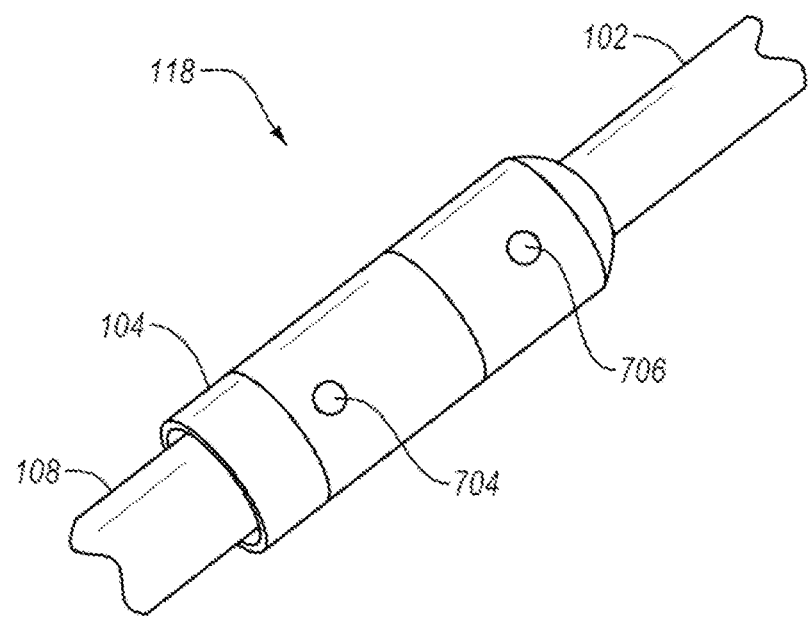
FIG. 7A is a perspective view schematic block diagram illustrating of a portion of the split axle of FIGS. 1 and 2 where a first shaft has a fixed sleeve and an inserted portion is positioned in a locked state, in various embodiments.
Figure 7B:
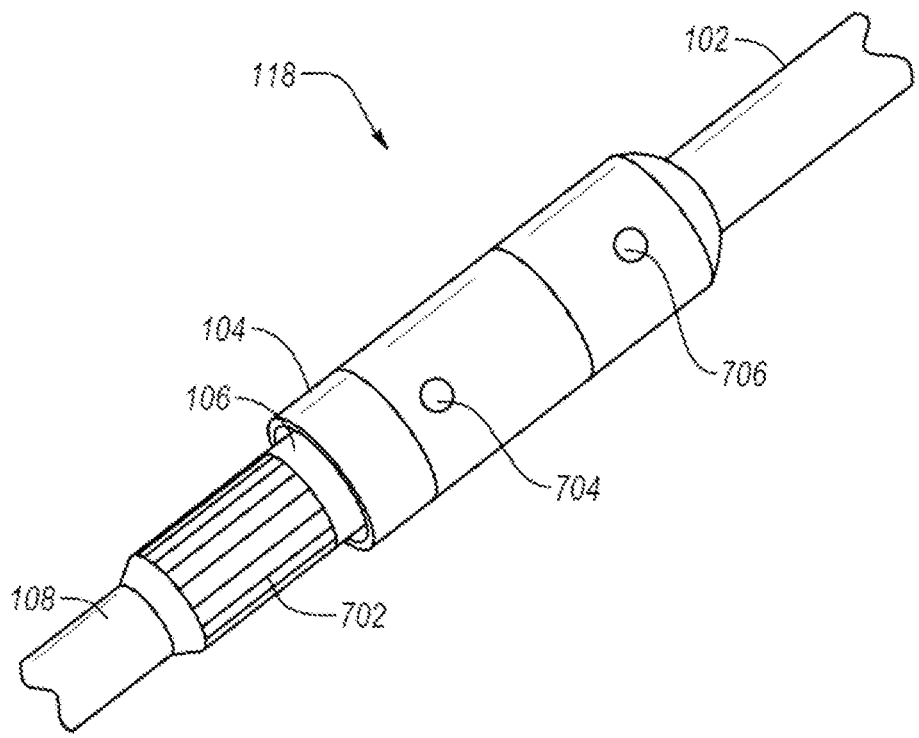
FIG. 7B is a perspective view schematic block diagram illustrating the portion of the split axle of FIG. 7A where the inserted portion is positioned in an unlocked state, in various embodiments.

FIG. 7A is a perspective view schematic block diagram illustrating of a portion of the split axle 118 of FIGS. 1 and 2 where a first shaft 102 has a fixed sleeve 104 and an inserted portion 106 is positioned in a locked state, in various embodiments. FIG. 7B is a perspective view schematic block diagram illustrating the portion of the split axle 118 of FIG. 7A where the inserted portion 106 is positioned in an unlocked state, in various embodiments. The sleeve 104 includes, in some embodiments, a first coupling mechanism (not shown) inside the sleeve 104 similar to the first coupling mechanism 502 of FIG. 5 and the inserted portion 106 includes a second coupling mechanism 702 similar to the second coupling mechanism 504 of FIG. 5.

In some embodiments, the sleeve 104 includes holes 704, 706 that accommodate a pin, insert, etc. that are used to maintain the inserted portion 106 in the locked state or the unlocked state. In the locked state, the inserted portion 106 is pushed into the sleeve 104 far enough so the first coupling mechanism of the sleeve engages the second coupling mechanism 702 of the inserted portion 106. A pin is not in the hole 704 furthest from the first shaft 102. In some embodiments, a pin is inserted in the hole 706 closest to the first shaft 102. In some examples, the pin extends through a hole (not shown) in the inserted portion 106. In other examples, the pin in the hole 706 closest to the first shaft 102 keeps the inserted portion 106 from extending further, is a position of for a pin to be stored, etc.

In some embodiments, in the unlocked state a pin, insert, etc. is inserted in the hole 704 of the sleeve 104 furthest from the first shaft 102, which keeps the inserted portion 106 far enough out that the first coupling mechanism does not engage the second coupling mechanism 702. In other embodiments, the sleeve 104 is long enough to extend over the second coupling mechanism 702 when not engaging the first coupling mechanism. In the embodiment, the inserted portion 106 may include a hole (not shown) that may then accommodate a pin, insert, etc. and the pin, a washer against the pin, or other device keeps the inserted portion 106 from sliding into the sleeve 104 to prevent the second coupling mechanism 702 from engaging the first coupling mechanism. In the locked state and in the unlocked state the inserted portion 106 has at least a portion in the sleeve 104. One of skill in the art will recognize other ways to allow the second coupling mechanism 702 to maintain engagement with the first coupling mechanism in the locked state and to prevent the second coupling mechanism 702 from engaging the first coupling mechanism in the unlocked state.

FIG. 8A is a perspective view schematic block diagram of the portion of split axle 118 in FIGS. 1 and 2 where the sleeve 104 is slidable along the split axle 118 and a sleeve 104 has a portion with a slot 804 and an inserted portion 106 has a portion with a key 802, according to various embodiments. In FIG. 8A, a first shaft 102 is shown separated from a second shaft 108 to show each component of the split axle 118. In some embodiments, the first shaft 102 includes a sleeve 104 that is slidable along the split axle 118. The second shaft 108 includes an inserted portion 106 that is inserted into the sleeve 104 and is rotatable within the sleeve 104. In some embodiments, a portion of the sleeve 104 includes a slot 804, and the inserted portion 106 includes a portion with a key 802.

The sleeve 104 is slidable along the split axle 118 such that the slot 804 is alignable with the key 802, and the key 802 is insertable into the slot 804. A locking mechanism of the split axle 118 includes a locked state when the sleeve 104 is in a first slide position and an unlocked state when the sleeve 104 is in a second slide position. FIG. 8B shows the locked state where the sleeve 104 in the first slide position such that the key is inserted into the slot 804. In the first slide position, the first shaft 102 and the second shaft 108 rotate together as one unit. FIG. 8C shows the unlocked states where the sleeve 104 is in the second slide position such that the key 802 is not in the slot 804. In the second slide position, the inserted portion 106 rotates freely within the sleeve 104.

Similar to the slidable sleeve 104 of FIG. 5, the sleeve 104 in FIGS. 8A-C moves with respect to the first shaft 102 in the first and second slide positions. The sleeve 104 includes a first coupling mechanism and the first shaft 102 includes a corresponding second coupling mechanism similar to the third coupling mechanism of the embodiments of FIG. 5.

In FIG. 8A, the slot 804 is depicted in two locations on opposite sides of the sleeve 104. The inserted portion 106 depicts a single key 802 where in some embodiments a second key 802 is located on an opposite side of the inserted portion 106 and is not shown. In other embodiments, the sleeve 104 includes a single slot 804 and the inserted portion 106 includes a single key 802. In other embodiments, the sleeve 104 includes three or more slots 804 and the inserted portion 106 includes a key 802 for each slot 804. In the depicted embodiments, the slot 804 goes all the way through the sleeve 104. In other embodiments, the slots 804 are internal to the sleeve 104 and do not penetrate an exterior surface of the sleeve 104.

Note that in FIG. 8C, the sleeve 104 is pulled back so that the key 802 is not in the slot 804 but the slot 804 is positioned to cover a portion of the inserted portion 106. In various embodiments, the sleeve 104 is held in place in the locked state such that the slot 804 covers the key 802 and the sleeve 104 is held in place in the unlocked state such that the key 802 is not covered by the slot 804. In some embodiments, the sleeve 104 is held in place in the locked state and in the unlocked state by means of holes in strategic locations and a pin inserted in the holes. In other embodiments, the sleeve 104 is held into the first slide position and the second slide position using a clip and corresponding grooves where the sleeve 104 pops into place when the clip encounters a groove. One of skill in the art will recognize other ways to maintain the sleeve 104 in a first and second slide positions.

In other embodiments, the inserted portion 106 is inserted to a stopping point at the first shaft 102 and is fixed with respect to the first shaft 102 and the sleeve 104 is slidable with respect to both the first shaft 102 and the inserted portion 106. In some embodiments, an end of the inserted portion 106 toward the first shaft 102 is coupled to the first shaft 102 and the inserted portion includes a rotatable joint (not shown). In other embodiments, the inserted portion 106 includes a bearing race and the first shaft 102 includes bearings that surround and fit in the bearing race of the inserted portion 106 which maintains the inserted portion 106 in a fixed position with respect to the first shaft 106. One of skill in the art will recognize other ways to maintain the inserted portion 106 in a fixed position with respect to the first shaft 102.

In the embodiments depicted in FIGS. 8A-8C, the sleeve 104 is depicted with an optional circular disk 806 oriented perpendicular to a direction of the first and second shafts 102, 108. In some embodiments, the circular disk 806 is used to slide the sleeve 104. In some examples, the circular disk 806 allows a user to move the sleeve 104 into place by hand. In other embodiments, another element engages the circular disk 806 to move the sleeve 104 and/or to maintain the sleeve 104 in a desired locked or unlocked state.

Figure 9:
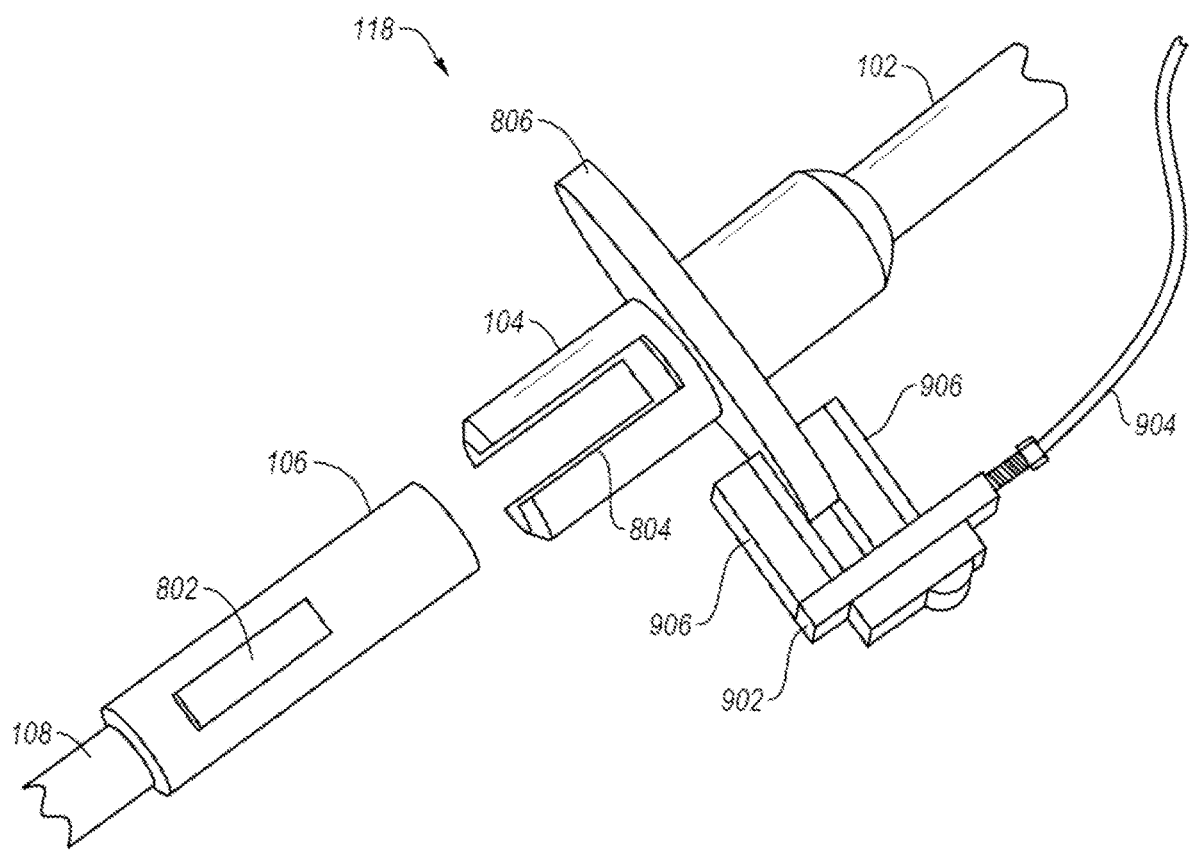
FIG. 9 is a perspective view schematic block diagram of a portion of the split axle in FIGS. 1 and 2 where a clutch is connected to the sleeve, and the sleeve is slidable along the split axle as actuated by the clutch, according to various embodiments.

FIG. 9 is a perspective view schematic block diagram of a portion of the split axle 118 in FIGS. 1 and 2 where a clutch 902 moves the sleeve 104 and the sleeve 104 is slidable along the split axle 118 as actuated by the clutch 902, according to various embodiments. The first shaft 102, sleeve 104, inserted portion 106, second shaft 108, key 802, slot 804 and circular disk 806 of the split axle 118 are substantially similar to those described above in relation to the split axle 118 of FIGS. 8A-C. The split axle 118 of FIG. 9 also includes a clutch 902 connected to a cable 904, which may be connected to an actuator in the form of a lever, a dial, or other device capable of moving a wire in the cable 904 to move the clutch 902.

The clutch 902, in some embodiments, is connected to the frame or other fixed component of the OHV and is coupled to plates 906 that move the sleeve 104 between the first slide position in the locked state and the second slide position in the unlocked state. While the OHV is in motion, the circular disk 806 rotates so, in some embodiments, the plates 906 and/or circular disk 806 include low friction surfaces that maintain the circular disk 806 in place while allowing for rotation of the circular disk 806. In other embodiments, an outer portion of the sleeve 104 is fixed and an inner portion of the sleeve 104 rotates with the first shaft 102.

The clutch 902 is connected to a wire within the cable 904 and to the actuator and movement of the actuator moves the wire, which moves the clutch 902. In other embodiments, the cable 904 is replaced with a hydraulic hose and the clutch 902 includes a hydraulic mechanism that moves the plates 906 and the actuator is a hydraulic switch, button, lever, etc. In other embodiments, rather than a circular disk 806 protruding from the sleeve 104, the sleeve 104 includes a groove and the plates 906 are replaced with forks that extend into the groove where movement of the forks moves the sleeve 104. One of skill in the art will recognize other ways for the slidable sleeve 104 to move with movement of components of a clutch 902.

Figure 10:
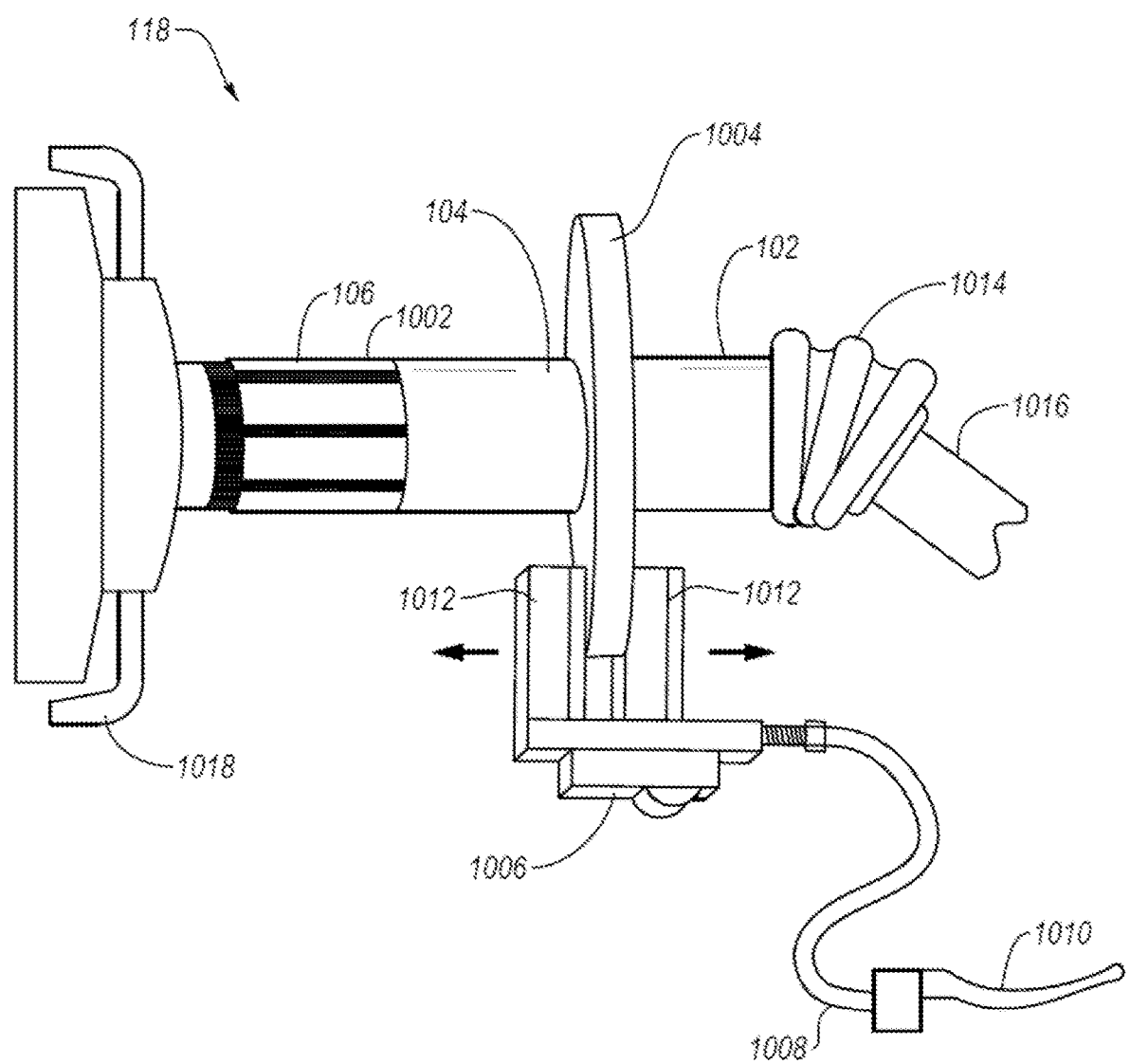
FIG. 10 is a perspective view schematic block diagram of a portion of the split axle in FIGS. 1 and 2 where the sleeve is slidable along the inserted portion using an automatic locking mechanism, according to various embodiments.

FIG. 10 is a perspective view schematic block diagram of a portion of the split axle 118 in FIGS. 1 and 2 where the sleeve 104 is slidable along the inserted portion 106 using an automatic locking mechanism, according to various embodiments. The first shaft 102 is coupled to the sleeve 104, which includes a first coupling mechanism (not shown) internal to the sleeve 104. The inserted portion 106 includes a second coupling mechanism 1002 that couples to the first coupling mechanism of the sleeve 104 when aligned. The inserted portion 106, in the depicted embodiments, are coupled to a portion 1018 that is within the gearbox 112 and the first shaft 102 is coupled to a joint 1014, which then connects to another section 1016 of the first shaft 102, which eventually connects to a wheel 110, 116.

The sleeve 104 is slidable along the inserted portion 106 to a first slide position and a second slide position. The inserted portion 106 includes a smooth portion without the second coupling mechanism 1002, which is depicted as inserted into the sleeve 104 and is rotatable within the sleeve 104, which is the second slide position representing the unlocked state. Where the inserted portion 106 is inserted further into the sleeve 104 such that the first coupling mechanism aligns with the second coupling mechanism 1002, the sleeve 104 and inserted portion 106 are in the first slide position, which is the locked state.

The sleeve 104 includes a circular disk 1004. A clutch 1006 with plates 1012 are positioned against the circular disk 1004 and the clutch 1006 moves the plates 1012 to the first or second slide positions. A cable 1008 includes a wire connected to the clutch 1006 and movement of the wire controls the clutch 1006 to move the plates 1012. An actuator connects to the cable 1008. In the embodiments depicted in FIG. 10 the actuator is a lever 1010. In other embodiments, the actuator is a dial, a button, etc. In other embodiments, the cable 1008 is replaced with a hydraulic hose and the actuator and clutch 1006 are hydraulic. The actuator is typically located away from the split axle 118 and may be located in a position near a steering wheel, handlebars, or other element within reach of a user riding the OHV. Mounting the actuator remote from the sleeve 104 will make it easier to move the sleeve 104 to a different slide position.

Figure 11:
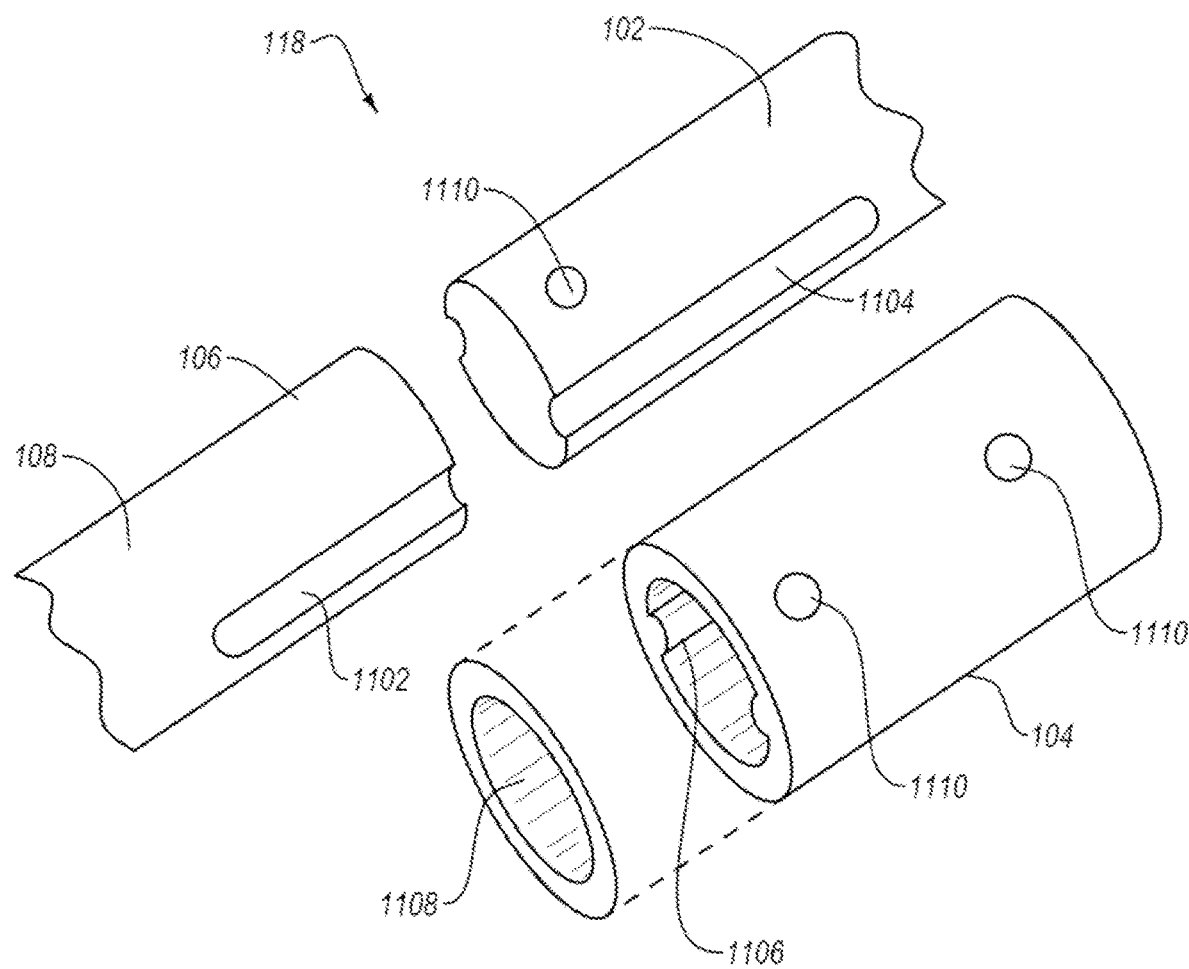
FIG. 11 is a perspective view schematic block diagram of a portion of the split axle in FIGS. 1 and 2 where the sleeve is slidable along the first shaft and the sleeve includes protrusions and the inserted portion has slots, according to various embodiments.

FIG. 11 is a perspective view schematic block diagram of a portion of the split axle 118 in FIGS. 1 and 2 where the sleeve 104 is slidable along the first shaft 102 and the sleeve includes protrusions 1106 and the inserted portion 106 has slots 1102, according to various embodiments. The first shaft 102 includes a slot 1104 that is long enough for the protrusions 1106 of the sleeve 104 to move from a locked position to an unlocked position. A portion 1108 of the sleeve 104 toward the second shaft 108 does not include protrusions 1106 so that when the sleeve 104 is retracted towards the first shaft 102 in an unlocked state, a section of the inserted portion 106 remains inside the portion 1108 of the sleeve 104 without protrusions 1106.

When the sleeve 104 is positioned forward towards the second shaft 108 in the locked state, the protrusions 1106 of the sleeve 104 extend into the slots 1102 of the inserted portion 106 and the slot 1104 of the first shaft 102 so that the first shaft 102 and the second shaft 108 rotate together at a same speed. While the sleeve 104 depicts two protrusions 1106, the sleeve 104 may include one protrusion 1106 or three or more protrusions 1106 and the inserted portion 106 and first shaft 102 include an equal number of slots 1102, 1104. Holes 1110 are included in the first shaft 102 and sleeve 104 and a pin is placed in one of the holes 1110 of the sleeve 104 and in the hole 1110 of the first shaft 102 to maintain the sleeve 104 in the locked state or unlocked state. In some embodiments, the sleeve 104 includes slots and a key in place of the protrusions 1106. In the locked state, the key is tall enough to engage the slots in the sleeve 104 and the slots 1102 in the inserted portion 106. In some embodiments, the unlocked state includes removal of the key so the inserted portion 106 is free to spin inside the sleeve 104.

Figure 12A:
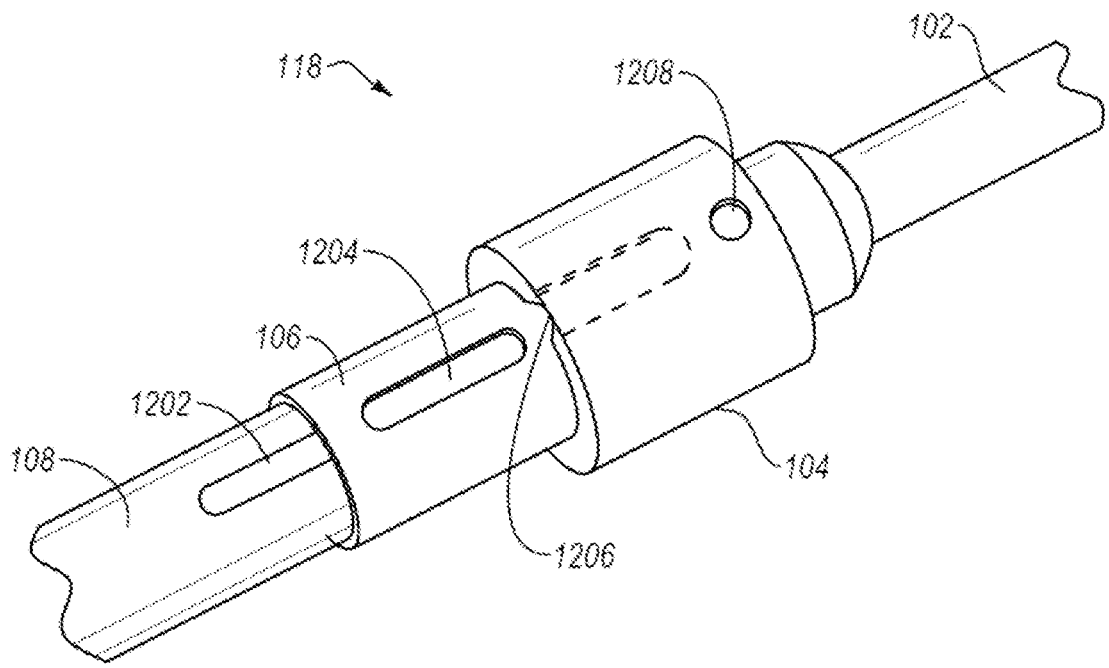
FIG. 12A is a perspective view schematic block diagram of a portion of the split axle in FIGS. 1 and 2 where the sleeve is slidable along the split axle and the inserted portion is telescoping, according to various embodiments.
Figure 12B:
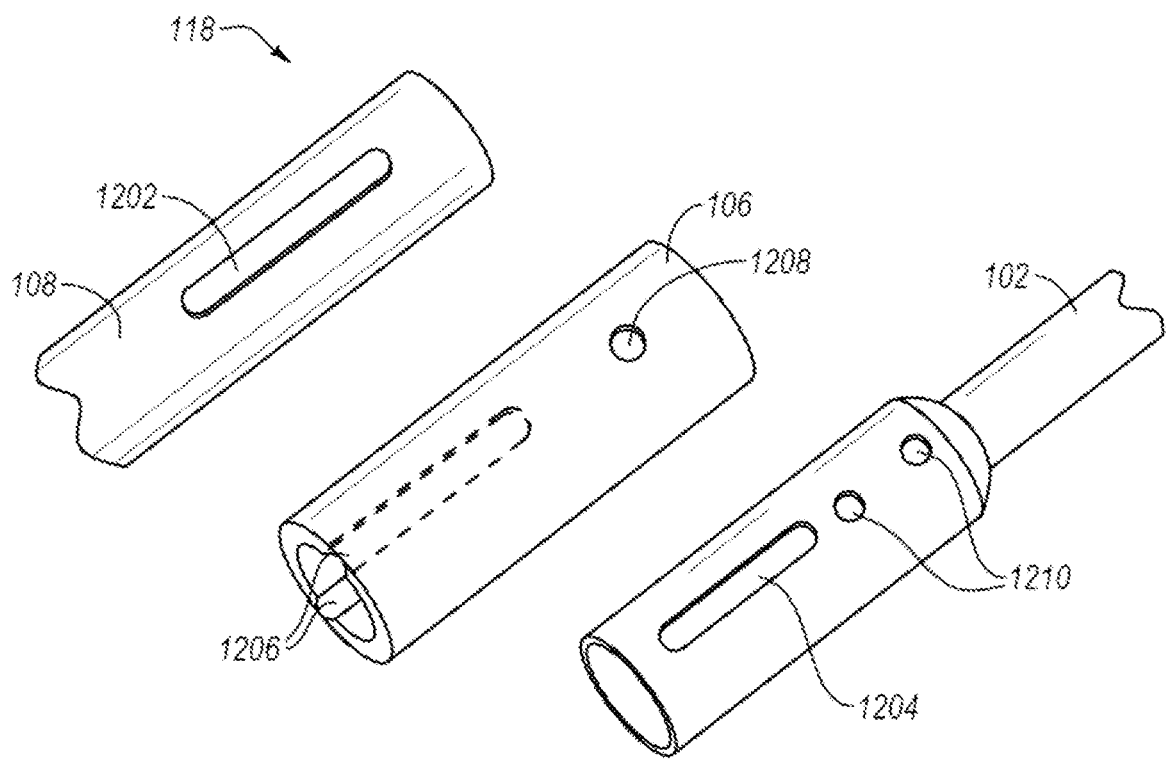
FIG. 12B is a perspective view schematic block diagram of another telescoping split axle.

FIG. 12A is a perspective view schematic block diagram of a portion of the split axle 118 in FIGS. 1 and 2 where the sleeve 104 is slidable along the split axle 118 and the inserted portion 106 is telescoping, according to various embodiments. FIG. 12B is a perspective view schematic block diagram of the telescoping split axle 118 of FIG. 12A in a disassembled state. The inserted portion 106 includes a slot (not shown) and the second shaft 108 includes a slot and key 1202 (or alternatively includes a protrusion) so that the second shaft 108 is able to move in and out of the inserted portion 106. The inserted portion 106 includes a slot and key 1204 (or alternatively includes a protrusion) and the sleeve 104 includes a slot 1206. The sleeve 104 is slidable along the inserted portion 106 so that in a forward position towards the second shaft 108, the slot 1206 of the sleeve 104 is over the slot and key 1204 of the inserted portion 106 in a locked state and the first and second shafts 102, 108 rotate together. When the sleeve 104 is retracted towards the first shaft 102, the slot 1206 in the sleeve 104 is not over the slot and key 1204 of the inserted portion 106 so that the first and second shafts 102, 108 rotate independently. The first shaft 102 includes a hole (not shown) and the sleeve 104 includes holes 1208 positioned to maintain the sleeve 104 in the forward locked state or retracted unlocked state.

Figure 12C:
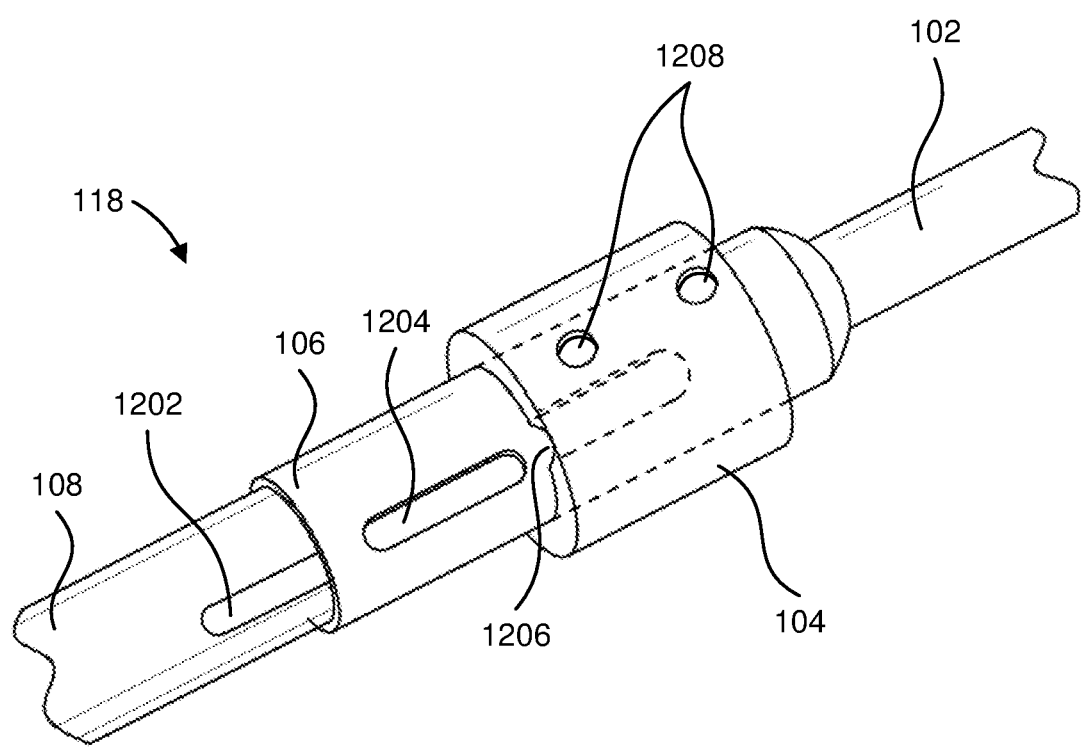
FIG. 12C is a perspective view schematic block diagram of another portion of the split axle in FIGS. 1 and 2 where the sleeve is slidable along the split axle and the inserted portion is telescoping, according to various embodiments.

FIG. 12C is a perspective view schematic block diagram of another portion of the split axle 118 in FIGS. 1 and 2 where the sleeve 104 is slidable along the split axle 118 and the inserted portion 106 is telescoping, according to various embodiments. The split axle 118 of FIG. 12C is similar the split axle 118 of FIG. 12A but includes holes 1208 positioned differently.

Figure 13:
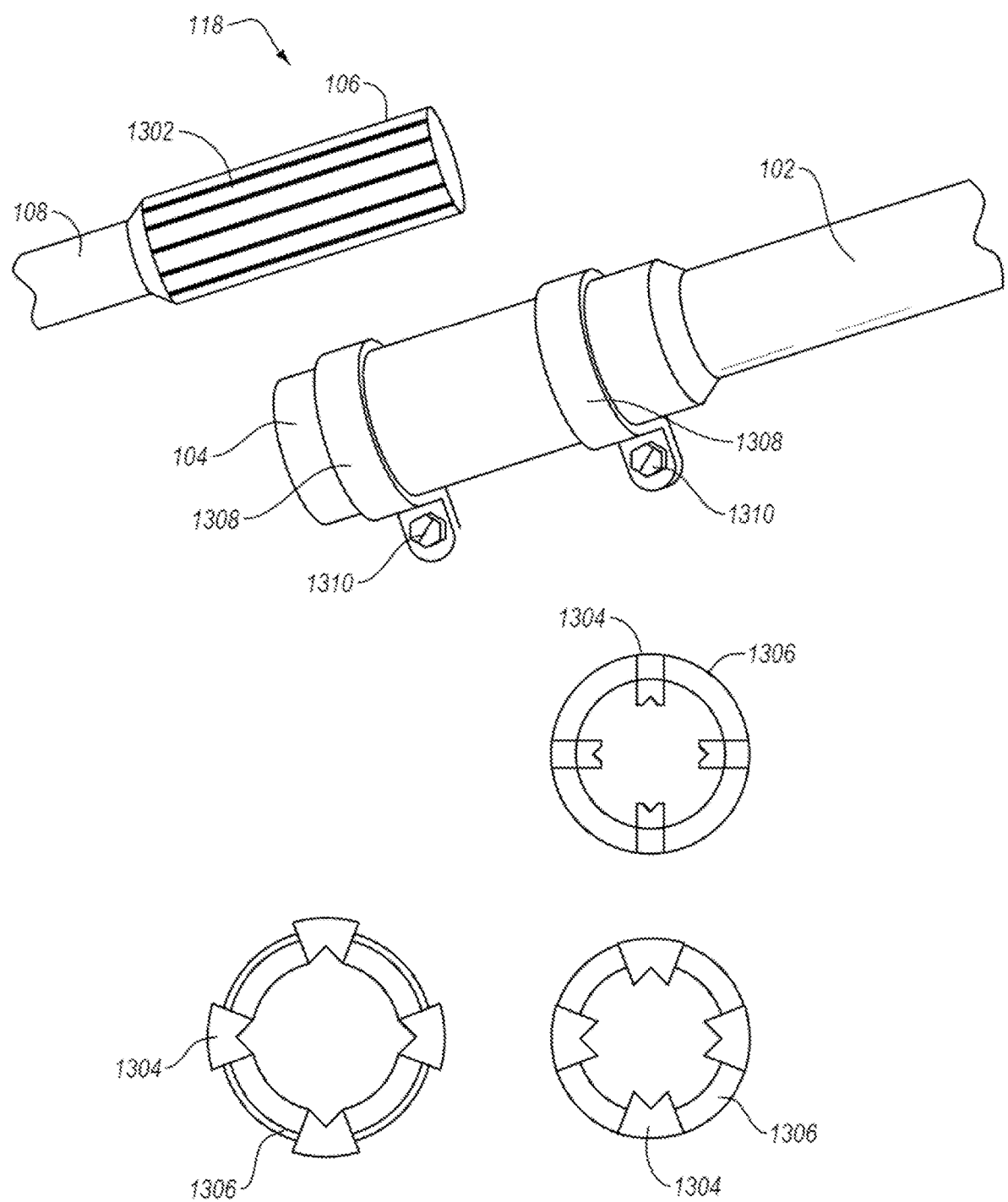
FIG. 13 is a perspective view schematic block diagram of a portion of the split axle in FIGS. 1 and 2 where the sleeve has sections movable in and out to engage a coupling mechanism on an inserted portion of a second shaft, according to various embodiments.

FIG. 13 is a perspective view schematic block diagram of a portion of the split axle 118 in FIGS. 1 and 2 where the sleeve 104 has engagement sections 1304 movable in and out to engage a coupling mechanism 1302 on an inserted portion 106 of a second shaft 108, according to various embodiments. The split axle 118 includes a first shaft 102 with a sleeve 104 and a second shaft 108 with an inserted portion 106. The inserted portion 106 includes a coupling mechanism 1302 with gears, teeth, grooves, a slot and key, or similar mechanism. The sleeve 104 includes engagement sections 1304 that are movable in and out in a direction toward the inserted coupling mechanism 1302 between separator sections 1306.

The locking mechanism of the split axle 118 of FIG. 13 includes a locked state when the engagement sections 1304 are moved inward far enough to engage the coupling mechanism 1302 of the inserted portion 106 and an unlocked state where the engagement sections 1304 are withdrawn from the coupling mechanism 1302 to a degree that an inside of the sleeve 104 is smooth enough to rotate independently from the inserted portion 106.

Three section views are depicted at the bottom right side of FIG. 13. The left section depicts the unlocked state and the two right sections depict two versions of the locked state. In some embodiments, the engagement sections 1304 are wedge-shaped so that movement of the engagement sections 1304 inward moves the separator sections 1306 outward. In other embodiments, the engagement sections 1304 are not wedge shaped but instead have sides that are parallel or at a slight angle so that movement of the engagement sections 1304 inward has little or no effect on the separator sections 1306. One of skill in the art will recognize other ways to shape the engagement sections 1304 to be movable in and out.

In some embodiments, the engagement sections 1304 are held in the unlocked position with a spring force and one or more bands 1308 are tightened to move the engagement sections 1304 inward, for example, via a bolt 1310. In some embodiments, the bands 1308 are coupled to the engagement sections 1304 and provide the spring force. In other embodiments, the engagement sections 1304 are coupled at an end closest to the first shaft 102 so that the spring force is provided by the end coupled to the first shaft 102. One of skill in the art will recognize other ways to provide a spring force to maintain the engagement sections 1304 in an outward, unlocked state until bands 1308 or other mechanism pushes the engagement sections 1304 inward.

In some embodiments, the engagement sections 1304 have teeth, ridges, etc. as depicted in FIG. 13. In other embodiments, the engagement sections 1304 are wedge-shaped with a smooth end facing the coupling mechanism 1302 and function as gears when in the locked state. One of skill in the art will recognize other shapes of the engagement sections 1304 that will engage with the coupling mechanism 1302.

FIG. 14A is a perspective view schematic block diagram of a portion of the split axle 118 in FIGS. 1 and 2 where the sleeve 104 is slidable along the inserted portion 106 using a fork-shaped automatic locking mechanism 1402, according to various embodiments. FIG. 14B is an end section view of the split axle 118 of FIG. 14A, according to various embodiments. FIG. 14C is a side view of the split axle 118 of FIG. 14A, according to various embodiments. The split axle 118 of FIGS. 14A-C are similar to the split axle 118 of FIG. 10 but have a different automatic locking mechanism 1402.

The first shaft 102 is coupled to the sleeve 104, which includes a first coupling mechanism (not shown) internal to the sleeve 104. The inserted portion 106 includes a second coupling mechanism 1404 that couples to the first coupling mechanism of the sleeve 104 when aligned. The inserted portion 106, in the depicted embodiments, are coupled to a portion that is within the gear box 112 (not shown) and the first shaft 102 is coupled to a joint 1014 (not shown), which then connects to another section (not shown) of the first shaft 102, which eventually connects to a wheel 110, 116.

The sleeve 104 is slidable along the inserted portion 106 to a first slide position and a second slide position. The inserted portion 106 includes a smooth portion without the second coupling mechanism 1404, which is depicted as partially inserted into the sleeve 104 and is rotatable within the sleeve 104. Where the inserted portion 106 is inserted into the sleeve 104 such that the first coupling mechanism aligns with the second coupling mechanism 1404, the sleeve 104 and inserted portion 106 are in the first slide position, which is the locked state.

The sleeve 104 includes a circular disk 1406. An actuator 1408 moves a fork-shaped arm 1410 positioned against the circular disk 1406 and the actuator 1408 moves the fork-shaped arm 1410, which moves the circular disk 1406 to move the sleeve 104 to the first or second slide positions. In some embodiments, a wire 1412 is connected to the actuator 1408 and provides power for movement of actuator 1408 to move the fork-shaped arm 1410. The wire 1412, in some embodiments, is connected to a controller (not shown), such as a two-position switch. A power source connects to the controller, the wire 1412, or to the actuator 1408. In some embodiments, the actuator 1408 includes a worm drive, gears, or other device to move the fork-shaped arm 1410. In some embodiments, the actuator 1408 is manual and the wire 1412 is a cable. In other embodiments, the wire 1412 is replaced with a hydraulic hose and the actuator 1408 is hydraulic. The controller is typically located away from the split axle 118 and may be located in a position near a steering wheel, handlebars, or other element within reach of a user riding the OHV. Mounting the controller remote from the sleeve 104 will make it easier to move the sleeve 104 to a different slide position.

Figure 15:
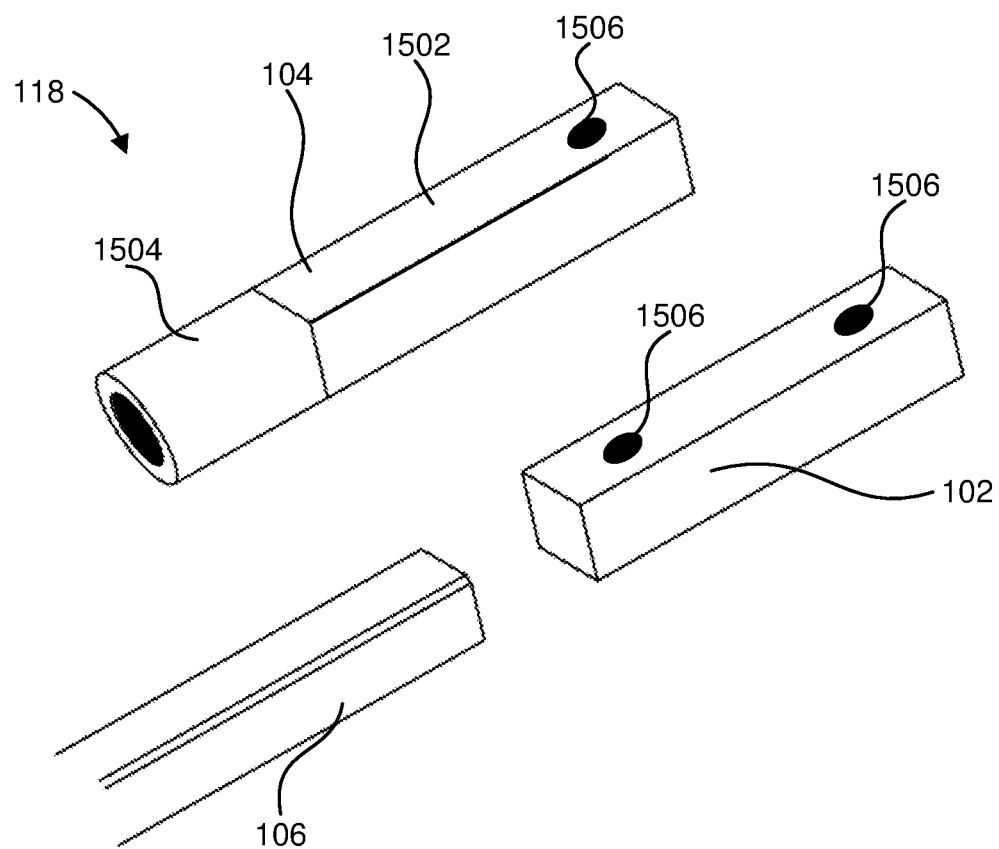
FIG. 15 is another perspective view schematic block diagram of a portion of the split axle of FIGS. 1 and 2 where the sleeve is slidable along the split axle and the sleeve, the first shaft, and the inserted portion have a square-shaped section, according to various embodiments.

FIG. 15 is another perspective view schematic block diagram of a portion of the split axle 118 of FIGS. 1 and 2 where the sleeve 104 is slidable along the split axle 118 and the sleeve 104, the first shaft 102, and the inserted portion 106 have a square-shaped section, according to various embodiments. In the depicted embodiments of FIG. 15, the sleeve 104 includes a square section 1502 and a round section 1504. When the sleeve is positioned so the square section 1502 covers both the inserted portion 106 and the first shaft 102, the sleeve 104 is in the locked state. When the sleeve 104 is positioned so the square section 1502 is over just the first shaft 102 and the round section 1504 is over the inserted portion 106, the sleeve 104 is in the unlocked state. In various embodiments, the sleeve 104 is positioned in the locked state or unlocked state using a pin, a shaft, a cotter key, a clip, etc. positioned in holes 1506 in the sleeve 104 and first shaft 102.

Figure 16:
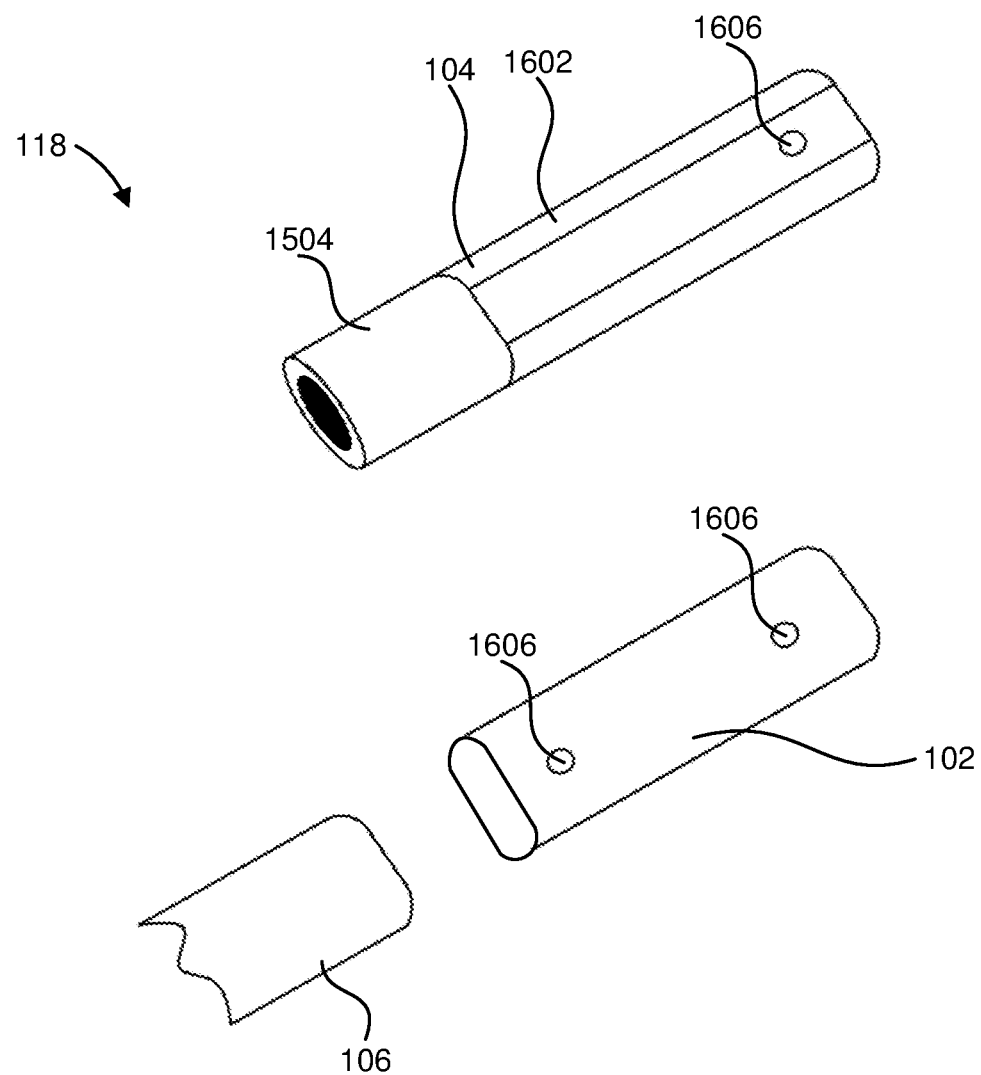
FIG. 16 is another perspective view schematic block diagram of a portion of the split axle of FIGS. 1 and 2 where the sleeve is slidable along the split axle and the sleeve, the first shaft, and the inserted portion have an oval-shaped section, according to various embodiments.

FIG. 16 is another perspective view schematic block diagram of a portion of the split axle 118 of FIGS. 1 and 2 where the sleeve 104 is slidable along the split axle 118 and the sleeve 104, the first shaft 102, and the inserted portion 106 have an oval-shaped section, according to various embodiments. In the depicted embodiments of FIG. 16, the sleeve 104 includes an oval section 1602 and a round section 1604. When the sleeve is positioned so the oval section 1602 covers both the inserted portion 106 and the first shaft 102, the sleeve 104 is in the locked state. When the sleeve 104 is positioned so the oval section 1602 is over just the first shaft 102 and the round section 1604 is over the inserted portion 106, the sleeve 104 is in the unlocked state. In various embodiments, the sleeve 104 is positioned in the locked state or unlocked state using a pin, a shaft, a cotter key, a clip, etc. positioned in holes 1606 in the sleeve 104 and first shaft 102.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a split axle of a vehicle comprising a first shaft and a second shaft, wherein:
        the first shaft comprises a sleeve; and
        the second shaft comprises an inserted portion that is inserted into the sleeve of the first shaft, wherein the inserted portion is rotatable within the sleeve; and
    a locking mechanism comprising a locked state and an unlocked state, wherein:
        the first shaft and the second shaft rotate together at a same speed when the locking mechanism is in the locked state; and
        the first shaft and the second shaft rotate independently when the locking mechanism is in the unlocked state.

2. The apparatus of claim 1, wherein the vehicle comprises a first axle and a second axle that rotate front or rear wheels of the vehicle, wherein the first axle and the second axle are each connected to a gear box and the split axle comprises a portion of the first axle, wherein:
    the first shaft is connected to the gear box of the vehicle; and
    the second shaft is connected to a front wheel or a rear wheel of the vehicle.

3. The apparatus of claim 1, wherein the sleeve is slidable along the split axle, and wherein:
    a section of the sleeve comprises a first coupling mechanism; and
    a section of the inserted portion comprises a second coupling mechanism, wherein:
        the locked state of the locking mechanism comprises the sleeve positioned in a first slide position with the first coupling mechanism and the second coupling mechanism aligned; and
        the unlocked state of the locking mechanism comprises the sleeve positioned in a second slide position with the first coupling mechanism not aligned with and the second coupling mechanism.

4. The apparatus of claim 3, wherein the first coupling mechanism and the second coupling mechanism each comprise:
    one or more teeth;
    one or more gears;
    one or more slots; and/or
    one or more keys.

5. The apparatus of claim 3, wherein the sleeve comprises a moveable lever mounted remote from the sleeve, wherein:
    the lever in an engaged position places the sleeve in the first slide position such that the locking mechanism is in the locked state; and
    the lever in a disengaged position places the sleeve in the second slide position such that the locking mechanism is in the unlocked state.

6. The apparatus of claim 1, wherein the sleeve comprises a first plate perpendicular to the first shaft and the inserted portion comprises a second plate perpendicular to the second shaft, wherein:
    the first plate comprises one or more openings ("first openings") and the second plate comprises one or more openings ("second openings"), and the first openings are alignable with the second openings;
    the locked state of the locking mechanism comprises at least one insert inserted through an opening of the first openings and an opening of the second openings; and
    the unlocked state of the locking mechanism comprises the first openings and the second openings without an insert.

7. The apparatus of claim 1, wherein the sleeve comprises a first opening and the inserted portion comprises a second opening, and the first opening of the sleeve is alignable with the second opening of the inserted portion, wherein:
    the locked state of the locking mechanism comprises a pin inserted through the first opening and the second opening; and
    the unlocked state of the locking mechanism comprises the first opening and the second opening without a pin.

8. The apparatus of claim 1, wherein the sleeve comprises a first slot and the inserted portion comprises a second slot, and the first slot and second slot are alignable, wherein:
the locked state of the locking mechanism comprises a key inserted through the first slot and the second slot; and
the unlocked state of the locking mechanism comprises the first slot and second slot without a key.

9. The apparatus of claim 1, wherein the vehicle comprises a single axle, wherein:
the single axle comprises a drive mechanism that rotates front wheels or rear wheels of the vehicle; and
a portion of the single axle comprises the split axle, wherein:
the first shaft is connected to the drive mechanism; and
the second shaft is connected to a front wheel or a rear wheel.

10. The apparatus of claim 9, wherein the drive mechanism comprises:
a shaft-drive;
a belt-drive; and/or
a chain-drive.

11. The apparatus of claim 1, wherein the locking mechanism is an automatic locking mechanism comprising an actuator, wherein:
the actuator in a first state places the automatic locking mechanism in the locked state; and
the actuator in a second state places the automatic locking mechanism in the unlocked state.

12. The apparatus of claim 11, wherein the actuator is remote from the automatic locking mechanism, wherein:
the actuator is connected a first end of a cable; and
the automatic locking mechanism is connected to a second end of the cable.

13. The apparatus of claim 1, wherein the sleeve comprises a portion with a slot ("slot") and the inserted portion comprises a portion with a key ("key"), and the sleeve is slidable along the split axle such that the key is insertable into the slot, wherein:
the locked state of the locking mechanism comprises the key inserted through the slot; and
the unlocked state of the locking mechanism comprises the slot without the key.

14. The apparatus of claim 1, wherein a portion of the first shaft, the sleeve, and at least a portion of the inserted portion of the second shaft comprise one of an oval shape, a rectangular shape, and a square shape, and wherein:
the locked state of the locking mechanism comprises the sleeve positioned in a first slide position with the inserted portion inside the sleeve; and
the unlocked state of the locking mechanism comprises the sleeve positioned in a second slide position with the inserted portion outside the sleeve.

15. An apparatus comprising:
a first axle of a vehicle connected between a gear box and a rear wheel, the first axle comprising a split axle, the split axle comprising a first shaft and a second shaft, wherein:
the first shaft comprises a sleeve; and
the second shaft comprises an inserted portion that is inserted into the sleeve of the first shaft, wherein the inserted portion is rotatable within the sleeve;
a second axle connected between the gear box and a second rear wheel of the vehicle; and
a locking mechanism comprising a locked state and an unlocked state, wherein:
the first shaft and the second shaft rotate together at a same speed when the locking mechanism is in the locked state; and
the first shaft and the second shaft rotate independently when the locking mechanism is in the unlocked state.

16. The apparatus of claim 15, wherein the first axle and the second axle form a solid rear axle and the gear box comprises one of a shaft-drive, a belt-drive, and a chain-drive.

17. The apparatus of claim 15, wherein the sleeve is slidable along the split axle, and wherein:
a section of the sleeve comprises a first coupling mechanism; and
a section of the inserted portion comprises a second coupling mechanism, wherein:
the locked state of the locking mechanism comprises the sleeve positioned in a first slide position with the first coupling mechanism and the second coupling mechanism aligned; and
the unlocked state of the locking mechanism comprises the sleeve positioned in a second slide position with the first coupling mechanism not aligned with and the second coupling mechanism, and
wherein the first coupling mechanism and the second coupling mechanism each comprise one or more teeth, one or more gears, one or more slots, and/or one or more keys.

18. The apparatus of claim 15, wherein the sleeve comprises a first opening and the inserted portion comprises a second opening, and the first opening of the sleeve is alignable with the second opening of the inserted portion, wherein:
the locked state of the locking mechanism comprises a pin inserted through the first opening and the second opening; and
the unlocked state of the locking mechanism comprises the first opening and the second opening without a pin.

19. The apparatus of claim 15, wherein the locking mechanism is an automatic locking mechanism comprising an actuator, wherein:
the actuator in a first state places the automatic locking mechanism in the locked state; and
the actuator in a second state places the automatic locking mechanism in the unlocked state.

20. A vehicle comprising:
a drive mechanism connected to a gear box;
a first axle of the vehicle connected between the gear box and a rear wheel, the first axle comprising a split axle, the split axle comprising a first shaft and a second shaft, wherein:
the first shaft comprises a sleeve; and
the second shaft comprises an inserted portion that is inserted into the sleeve of the first shaft, wherein the inserted portion is rotatable within the sleeve;
a second axle connected between the gear box and a second rear wheel of the vehicle; and
a locking mechanism comprising a locked state and an unlocked state, wherein:
the first shaft and the second shaft rotate together at a same speed when the locking mechanism is in the locked state; and
the first shaft and the second shaft rotate independently when the locking mechanism is in the unlocked state.

\* \* \* \* \*